US011935068B1

(12) United States Patent
Long et al.

(10) Patent No.: US 11,935,068 B1
(45) Date of Patent: Mar. 19, 2024

(54) METHODS AND APPARATUS FOR MOBILE DEVICE MESSAGING-BASED COMMUNICATIONS USING CUSTOM-GENERATED DEEPLINKS AND BASED ON THE HYPER TEXT TRANSFER PROTOCOL (HTTP)

(71) Applicant: Attentive Mobile Inc., New York, NY (US)

(72) Inventors: Brian Long, New York, NY (US); Brooke Burdge, New York, NY (US); Andrew Jones, Brooklyn, NY (US); Eric Miao, Brooklyn, NY (US); Ryan Tsang, Brooklyn, NY (US); Ethan Lo, Brooklyn, NY (US); Elyssa Albert, Brooklyn, NY (US)

(73) Assignee: Attentive Mobile Inc., New York, NY (US)

( * ) Notice: Subject to any disclaimer, the term of this patent is extended or adjusted under 35 U.S.C. 154(b) by 0 days.

(21) Appl. No.: 17/888,343

(22) Filed: Aug. 15, 2022

Related U.S. Application Data

(63) Continuation of application No. 17/569,265, filed on Jan. 5, 2022, now Pat. No. 11,416,897, which is a
(Continued)

(51) Int. Cl.
*G06Q 30/0601* (2023.01)
*G06F 16/951* (2019.01)
(Continued)

(52) U.S. Cl.
CPC ......... *G06Q 20/425* (2013.01); *G06F 16/951* (2019.01); *G06F 16/955* (2019.01);
(Continued)

(58) Field of Classification Search
USPC ......................................................... 705/14
See application file for complete search history.

(56) References Cited

U.S. PATENT DOCUMENTS 8,015,615 B1 * 9/2011 Agrawal ............... H04L 43/00
713/168
9,105,046 B1 8/2015 Dias et al.
(Continued)

OTHER PUBLICATIONS

User_Reachability_in_Multi-Apps_Environment (Year: 2015).*
(Continued)

*Primary Examiner* — Gautam Ubale
(74) *Attorney, Agent, or Firm* — COOLEY LLP

(57) ABSTRACT

In some embodiments, a method includes in response to an integration tag included in a webpage at a first user interface being executed at a mobile device, receiving a mobile device identifier and a request to retrieve a purchase identifier. The method includes sending a first signal causing a frame to be provided within the webpage at the first user interface. The method includes in response to a first user input, receiving a Hyper Text Transfer Protocol (HTTP) POST request and determining a uniform resource identifier (URI). The method includes retrieving purchase information and sending a HTTP response message including the URI of the second user interface and the purchase information to deeplink to the second user interface and to cause the second user interface to be rendered at the mobile device with the purchase information pre-populated in an input field of a text message.

23 Claims, 12 Drawing Sheets

Related U.S. Application Data continuation of application No. 17/496,590, filed on Oct. 7, 2021, now Pat. No. 11,553,074, which is a continuation of application No. 15/986,569, filed on May 22, 2018, now abandoned.

(60) Provisional application No. 62/511,413, filed on May 26, 2017.

(51) Int. Cl.

| | | |
|---|---|---|
| *G06F 16/955* | (2019.01) | |
| *G06Q 20/32* | (2012.01) | |
| *G06Q 20/38* | (2012.01) | |
| *G06Q 20/42* | (2012.01) | |
| *G06Q 30/0207* | (2023.01) | |
| *G06Q 30/0251* | (2023.01) | |
| *H04L 51/046* | (2022.01) | |
| *H04L 67/02* | (2022.01) | |
| *H04W 12/06* | (2021.01) | |

(52) U.S. Cl.
CPC ..... *G06Q 20/3223* (2013.01); *G06Q 20/3255* (2013.01); *G06Q 20/3821* (2013.01); *G06Q 20/386* (2020.05); *G06Q 30/0236* (2013.01); *G06Q 30/0267* (2013.01); *G06Q 30/0271* (2013.01); *G06Q 30/0601* (2013.01); *G06Q 30/0641* (2013.01); *H04L 51/046* (2013.01); *H04L 67/02* (2013.01); *H04W 12/06* (2013.01)

(56) References Cited

U.S. PATENT DOCUMENTS

| | | | |
|---|---|---|---|
| 9,195,477 | B1 | 11/2015 | Spencer |
| 9,251,268 | B2 | 2/2016 | Schechter et al. |
| 9,465,682 | B1 | 10/2016 | Powell et al. |
| 9,594,477 | B1 | 3/2017 | Ardakani et al. |
| 9,633,378 | B1* | 4/2017 | Nath .................. G06Q 30/0276 |
| 9,806,942 | B2 | 10/2017 | Saxena et al. |
| 9,811,395 | B1 | 11/2017 | Greenwood et al. |
| 9,847,973 | B1 | 12/2017 | Jakobsson et al. |
| 10,042,946 | B2 | 8/2018 | Boudville |
| 10,055,211 | B2 | 8/2018 | Maddern et al. |
| 10,121,186 | B2 | 11/2018 | Isaacson et al. |
| 10,275,421 | B1* | 4/2019 | Clark ................. G06Q 30/0267 |
| 10,275,798 | B1 | 4/2019 | Clark et al. |
| 10,423,691 | B1 | 9/2019 | Patel et al. |
| 10,521,496 | B1 | 12/2019 | Goodwin et al. |
| 10,535,005 | B1 | 1/2020 | Badr et al. |
| 10,659,400 | B2 | 5/2020 | Moon et al. |
| 10,691,409 | B2 | 6/2020 | Maltsev et al. |
| 10,757,552 | B2 | 8/2020 | Gross et al. |
| 10,789,626 | B2 | 9/2020 | Nath et al. |
| 10,810,592 | B1 | 10/2020 | Omojola et al. |
| 10,817,914 | B1 | 10/2020 | Nath et al. |
| 10,868,711 | B2 | 12/2020 | Chor |
| 11,055,744 | B2 | 7/2021 | Conrad et al. |
| 11,117,380 | B2 | 9/2021 | Tamaru et al. |
| 11,151,603 | B2 | 10/2021 | Tasharofi et al. |
| 11,170,380 | B1 | 11/2021 | Long et al. |
| 11,211,156 | B2 | 12/2021 | Iyer et al. |
| 11,336,703 | B1 | 5/2022 | Meersma et al. |
| 11,416,887 | B1 | 8/2022 | Long et al. |
| 11,416,897 | B1 | 8/2022 | Long et al. |
| 11,553,074 | B1 | 1/2023 | Long et al. |
| 2002/0152210 | A1 | 10/2002 | Johnson et al. |
| 2006/0224693 | A1 | 10/2006 | Gaidemak et al. |
| 2008/0059571 | A1 | 3/2008 | Khoo |
| 2008/0307517 | A1 | 12/2008 | Grigoriev et al. |
| 2010/0063902 | A1* | 3/2010 | Constantz ............ G06Q 40/00 705/28 |
| 2010/0099441 | A1 | 4/2010 | Agarwal et al. |
| 2011/0302316 | A1 | 12/2011 | Chou et al. |
| 2012/0084152 | A1 | 4/2012 | Highbaugh, Sr. et al. |
| 2012/0144281 | A1 | 6/2012 | Schechter et al. |
| 2012/0232985 | A1* | 9/2012 | Lasker .................. G06Q 30/02 705/14.41 |
| 2013/0073381 | A1 | 3/2013 | Binkley |
| 2013/0073400 | A1 | 3/2013 | Heath |
| 2013/0117089 | A1 | 5/2013 | Pachikov et al. |
| 2014/0103373 | A1 | 4/2014 | Abrahami et al. |
| 2014/0172504 | A1 | 6/2014 | Duva et al. |
| 2014/0229898 | A1* | 8/2014 | Terwedo ............. G06F 3/04842 715/835 |
| 2014/0282994 | A1 | 9/2014 | Dietrich |
| 2015/0052061 | A1 | 2/2015 | Anderson et al. |
| 2015/0088980 | A1 | 3/2015 | Lakes et al. |
| 2015/0100468 | A1 | 4/2015 | Blackhurst et al. |
| 2015/0106181 | A1 | 4/2015 | Kluth |
| 2015/0127554 | A1 | 5/2015 | Steif et al. |
| 2015/0154644 | A1 | 6/2015 | Saxena et al. |
| 2015/0156061 | A1* | 6/2015 | Saxena .................. H04L 67/34 715/733 |
| 2015/0178784 | A1* | 6/2015 | Oliver et al. ....... G06Q 30/0267 705/14.64 |
| 2015/0215383 | A1 | 7/2015 | Sun et al. |
| 2015/0220943 | A1 | 8/2015 | Dossick et al. |
| 2015/0294358 | A1 | 10/2015 | Galadari et al. |
| 2016/0055133 | A1 | 2/2016 | Look et al. |
| 2016/0057154 | A1 | 2/2016 | Ferguson et al. |
| 2016/0142858 | A1* | 5/2016 | Molinet et al. ........ H04L 67/025 709/203 |
| 2016/0142859 | A1* | 5/2016 | Molinet .................. H04L 67/63 709/203 |
| 2016/0188721 | A1 | 6/2016 | Glover et al. |
| 2016/0210334 | A1 | 7/2016 | Prophete et al. |
| 2016/0234330 | A1 | 8/2016 | Popowitz et al. |
| 2016/0292728 | A1 | 10/2016 | Kang et al. |
| 2017/0004209 | A1 | 1/2017 | Johl et al. |
| 2017/0046180 | A1 | 2/2017 | Desineni et al. |
| 2017/0099228 | A1 | 4/2017 | Hunsperger et al. |
| 2017/0116339 | A1 | 4/2017 | Stein et al. |
| 2017/0118500 | A1 | 4/2017 | Carroll et al. |
| 2017/0142214 | A1 | 5/2017 | Nanavati et al. |
| 2017/0169473 | A1 | 6/2017 | Boudville |
| 2017/0193087 | A1 | 7/2017 | Savliwala et al. |
| 2017/0213464 | A1 | 7/2017 | Emadi et al. |
| 2017/0222940 | A1 | 8/2017 | O'Kelley et al. |
| 2017/0228797 | A1* | 8/2017 | Nath .................. G06F 16/951 |
| 2017/0236196 | A1 | 8/2017 | Isaacson et al. |
| 2017/0255915 | A1 | 9/2017 | Chandrasekaran et al. |
| 2017/0256003 | A1 | 9/2017 | Isaacson et al. |
| 2017/0287009 | A1* | 10/2017 | Austin .................. H04W 12/00 |
| 2017/0337609 | A1 | 11/2017 | Turemen et al. |
| 2017/0351693 | A1* | 12/2017 | Boudville ............. G06F 16/958 |
| 2018/0018304 | A1 | 1/2018 | Pritchard et al. |
| 2018/0020038 | A1 | 1/2018 | Penov et al. |
| 2018/0020039 | A1 | 1/2018 | Loeb et al. |
| 2018/0052926 | A1 | 2/2018 | Boudville |
| 2018/0052943 | A1 | 2/2018 | Hui et al. |
| 2018/0074999 | A1 | 3/2018 | Cogan |
| 2018/0095604 | A1 | 4/2018 | Nguyen et al. |
| 2018/0103151 | A1 | 4/2018 | Erm |
| 2018/0124148 | A1 | 5/2018 | Boudville |
| 2018/0183618 | A1 | 6/2018 | Jayaram et al. |
| 2018/0183619 | A1 | 6/2018 | Jayaram et al. |
| 2018/0239576 | A1 | 8/2018 | Fain |
| 2018/0260417 | A1 | 9/2018 | Mahadevan et al. |
| 2018/0261861 | A1* | 9/2018 | Jamal ........................ F17C 5/06 |
| 2018/0286236 | A1 | 10/2018 | Mazzola et al. |
| 2018/0300754 | A1 | 10/2018 | Narasimhan et al. |
| 2018/0324210 | A1 | 11/2018 | Gadot |
| 2018/0324265 | A1 | 11/2018 | MacSkassy et al. |
| 2019/0246238 | A1 | 8/2019 | Crutchfield et al. |
| 2020/0104192 | A1* | 4/2020 | Siddhartha ............. G06F 9/542 |
| 2020/0111494 | A1 | 4/2020 | Lau et al. |
| 2020/0242303 | A1 | 7/2020 | Hwang et al. |
| 2021/0233097 | A1* | 7/2021 | Doumar .................. H04L 51/02 |
| 2021/0377309 | A1 | 12/2021 | Jogand-Coulomb et al. |
| 2023/0017848 | A1 | 1/2023 | Doumar et al. |

(56) References Cited

U.S. PATENT DOCUMENTS

2023/0021327 A1    1/2023   Doumar
2023/0206267 A1    6/2023   Doumar

OTHER PUBLICATIONS

Send Messages & SMS from Web & Email with a URL Trick (Year: 2016).*
Aladdin_Automating_Release_of_Android_Deep_Links_to_In-App_Content (Year: 2017).*
Cross-Platform_Access_Control_for_Mobile_Web_Applications (Year: 2012).*
Piecing_together-app_behavior_from_multiple_artifacts_A_case_study (Year: 2015).*
U.S. Appl. No. 17/888,373 Amendment Under 37 CFR 1.312, filed Mar. 17, 2023, 10 pages.
U.S. Appl. No. 18/306,017, filed Apr. 24, 2023, 41 pages.
Advisory Action dated Sep. 1, 2020, for U.S. Appl. No. 15/986,569, 5 pages.
Android: how to pre-populate an SMS message; Nov. 20, 2014; Stack Overflow; pp. 1-3.
Appeal Brief filed on Nov. 23, 2020, for U.S. Appl. No. 15/986,569, 74 pages.
Declaration of John G. Day in Support of Motion to Dismiss, *Attentive Mobile Inc.* v. *317 Labs, Inc. d/b/a Emotive*, C.A. No. 22-1163-CFC, Oct. 31, 2022, 37 pages.
Declaration of Michael J. Flynn, *Attentive Mobile Inc.* v. *317 Labs, Inc. d/b/a Emotive*, C.A. No. 22-1163-CFC, Nov. 30, 2022, 19 pages.
Defendant's Opening Brief for Motion to Dismiss, *Attentive Mobile Inc.* v. *317 Labs, Inc. d/b/a Emotive*, C.A. No. 22-1163-CFC, Oct. 31, 2022, 31 pages.
Final Office Action dated Aug. 8, 2019, for U.S. Appl. No. 15/986,569, 14 pages.
Final Office Action dated Jun. 26, 2020, for U.S. Appl. No. 15/986,569, 25 pages.
Final Office Action dated May 12, 2021, for U.S. Appl. No. 17/114,937, 15 pages.
Hoffman T; Long Code v. Short Code: Why the Difference Maters; Apr. 20, 2016; text-em-all.com; pp. 1-7.
Href link to send text message; May 12, 2017; Stack Overflow; pp. 1-3.
Non Final Office Action for U.S. Appl. No. 18/082,481 dated Mar. 23, 2023, 35 pages.
Non-Final Office Action for U.S. Appl. No. 18/082,498 dated Mar. 23, 2023, 31 pages.
Non-Final Office Action dated Mar. 17, 2022, for U.S. Appl. No. 17/569,265, 54 pages.
Non-Final Office Action dated Mar. 4, 2022, for U.S. Appl. No. 17/496,590, 40 pages.
Non-Final Office Action dated Feb. 20, 2020, for U.S. Appl. No. 15/986,569, 22 pages.
Non-Final Office Action dated Jul. 22, 2021, for U.S. Appl. No. 17/114,937, 13 pages.
Non-Final Office Action dated Mar. 21, 2019, for U.S. Appl. No. 15/986,569, 14 pages.
Non-Final Office Action dated Mar. 4, 2021, for U.S. Appl. No. 17/114,937, 12 pages.
Non-Final Office Action dated Oct. 29, 2018, for U.S. Appl. No. 15/986,569, 13 pages.
Notice of Allowance for U.S. Appl. No. 17/888,373, dated Feb. 21, 2023, 9 pages.
Plaintiff's Answering Brief for Motion to Dismiss, *Attentive Mobile Inc.* v. *317 Labs, Inc. d/b/a Emotive*, C.A. No. 22-1163-CFC, Nov. 30, 2022, 32 pages.
RFC 5724: URI Scheme for Global System for Mobile Communications (GSM) Short Message Service (SMS); Jan. 2010; Internet Engineering Task Force (IETF); pp. 1-18.
Solano et al., "One-Time URL: A Proximity Security Mechanism between Internet of Things and Mobile Devices," Sensors, Oct. 13, 2016, vol. 16, No. 1694, 17 pages (Year: 2016).
U.S. Notice of Allowance for U.S. Appl. No. 17/569,265, dated Jun. 24, 2022, 4 pages.
U.S. Notice of Allowance for U.S. Appl. No. 17/569,265, dated Jun. 6, 2022, 17 pages.
U.S. Notice of Allowance for U.S. Appl. No. 17/669,114, dated Jun. 16, 2022, 11 pages.
U.S. Office Action for U.S. Appl. No. 17/888,373, dated Nov. 10, 2022, 18 pages.
U.S. Appl. No. 18/082,481, filed Dec. 15, 2022, 71 pages total.
U.S. Appl. No. 18/082,498, filed Dec. 15, 2022, 71 pages total.
Defendant's Opening Brief for Motion to Dismiss, *Attentive Mobile Inc.* v. *Stodge Inc. d/b/a Postscript*, C.A. No. 23-87-CFC-CJB, Feb. 15, 2023, 29 pages.
Defendant's Reply Brief for Motion to Dismiss, *Attentive Mobile Inc.* v. *Stodge Inc. d/b/a Postscript*, C.A. No. 23-087-CJB, Mar. 29, 2023, 15 pages.
Motion to Dismiss, *Attentive Mobile Inc.* v. *Stodge Inc. d/b/a Postscript*, C.A. No. 23-87-CFC-CJB, Feb. 15, 2023, 3 pages.
Non-Final Office Action dated Jul. 25, 2022, for U.S. Appl. No. 17/496,590, 52 pages.
Notice of Allowance for U.S. Appl. No. 17/888,373 dated Apr. 18, 2023, 5 pages.
Plaintiffs Answering Brief for Motion to Dismiss, *Attentive Mobile Inc.* v. *Stodge Inc. d/b/a Postscript*, C.A. No. 23-087 (CJB), Mar. 15, 2023, 26 pages.
Complaint for Patent Infringement in *Attentive Mobile Inc.* v. *Stodge Inc. d/b/a Postscript*, Case No. 1-23-cv-00086 (D. Del. filed Jan. 25, 2023).
Cristal, "Ad Serving Technology, Understand the marketing revelation that commercialized the internet," ISBN: 148467572 (2014), pp. 1-27, 190-193, 282-283, 584-585.
Declaration of Dr. Henry Houh, *Attentive Mobile Inc.* v. *Stodge Inc. d/b/a Postscript*, Inter Partes Review Exhibit 1002, Aug. 16, 2023, 103 pages.
Final Office Action for U.S. Appl. No. 18/082,481 dated Jul. 31, 2023, 30 pages.
Firtman, M., "Programming the Mobile Web, Second Edition", O'Reilly (2013), pp. 553-595.
Flanagan, D. "JavaScript: The Definitive Guide, Sixth Edition", O'Reilly Media, Inc. (2011), pp. 361-411.
Ha, A, "TapCommerce's founders are back with attentive, a messaging startup that's raised $13M," available at https:techcrunch.com/2018/02/08/attentive-launch/, Feb. 8, 2018, 9 pages.
Levine, B., "Led by TapCommerce founders, startup Attentive launches SMS/MMS marketing platform," available at https://martech.org/led-tapcommerce-founders-startup-attentive-launches-smsmms-marketing-platform/, Feb. 9, 2018, 5 pages.
Mobile Marketing Association, "US Consumer Best Practices for Messaging", version 7.0, (2012), available at https://www.mmaglobal.com/documents/us-consumer-best-practices, 46 pages.
Notice of Allowance for U.S. Appl. No. 18/082,498 dated Aug. 4, 2023, 10 pages.
Petition for Inter Partes Review Under 35 U.S.C. §§ 311-319 and 37 C.F.R. § 42.200 et seq. for *Stodge, Inc. d/b/a PostScript*, petitioner, v. *Attentive, Inc.*, Patent Holder, IPR2023-01338, U.S. Pat. No. 11,416,887, Aug. 19, 2023, 78 pages.
Scheiner, M., "Attentive Gets the Message Out," available at https://crm.org/news/attentive-gets-the-message-out, Feb. 27, 2020, 12 pages.
U.S. Appl. No. 13/461,541 filed May 1, 2012, 48 pages.
U.S. Appl. No. 62/079,512 filed Nov. 13, 2014, 27 pages.
Defendant 317 Labs, Inc. d/b/a/ Emotive's Answer and Defenses, C.A. No. 22-1163-CJB, Oct. 4, 2023, 16 pages.
Defendant Stodge Inc. d/b/a Postcript's Amended Answer and Counterclaims to Plaintiff's Complaint for Patent Infringement, Aug. 25, 2023, 55 pages.
Joint Claim Construction Chart for U.S. Pat. Nos. 11,416,887, 11,416,897, and 11,553,074, dated Oct. 13, 2023, 14 pages.

(56) References Cited

OTHER PUBLICATIONS

Petition for Inter Partes Review Under 35 U.S.C. §§ 311-319 and 37 C.F.R. §42.200 et seq. for *Stodge, Inc. d/b/a PostScript, petitioner, v. Attentive, Inc.*, Patent Holder, IPR2024-00129, U.S. Pat. No. 11,553,074, Oct. 31, 2023, 78 pages.

Plaintiff's Preliminary Identification of Terms and Phrases for Construction and Preliminary Proposed Constructions, *Attentive Mobile Inc.v. Stodge Inc. d/b/a Postscripts*, Case No. 1-23-cv-00087, Sep. 29, 2023, 4 pages.

317 Labs, Inc. d/b/a/ Emotive's and Stodge Inc. d/b/a/ Postscript's Joint Proposed Claim Terms and Constructions, *Attentive Mobile Inc.v. Stodge Inc. d/b/a Postscripts*, Case No. 1-23-cv-00087, Sep. 29, 2023, 4 pages.

Declaration of Dr. Henry Houh, *Attentive Mobile Inc.v. Stodge Inc. d/b/a Postscript*, Oct. 31, 2023, 118 pages.

Petitioner for Inter Partes Review Under 35 U.S.C. §§ 311-319 and 37 C.F.R. § 42.200 et seq. for *Stodge, Inc. d/b/a PostScript*, Petitioner, v. *Attentive, Inc.*, Patent Holder, IPR2024-00129, U.S. Pat. No. 11,416,897, Oct. 19, 2023, 80 pages.

Declaration of Dr. Henry Houh, *Attentive Mobile Inc.v. Stodge Inc. d/b/a Postscript*, for U.S. Pat. No. 11/416,897, Oct. 19, 2023, 114 pages.

\* cited by examiner

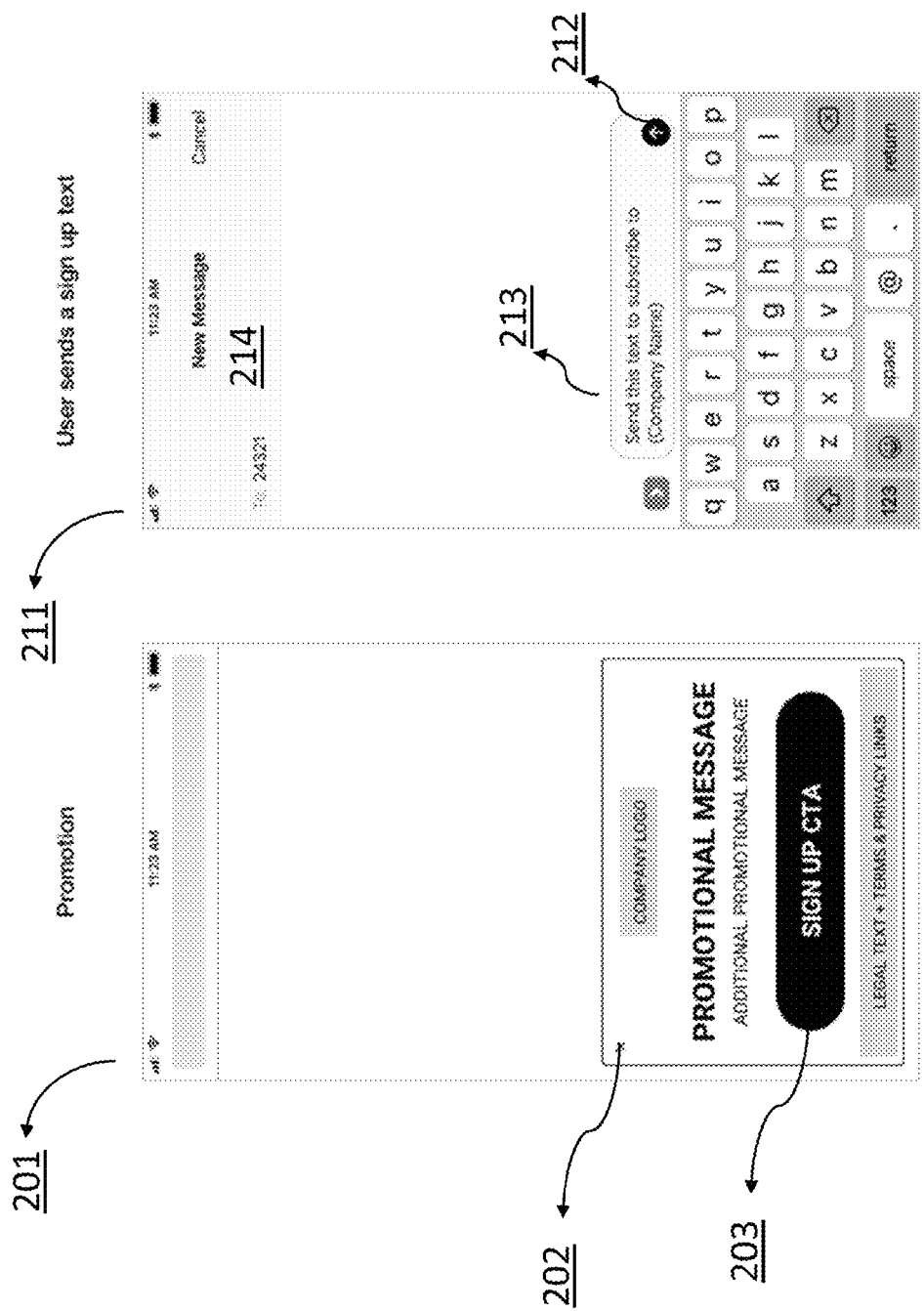

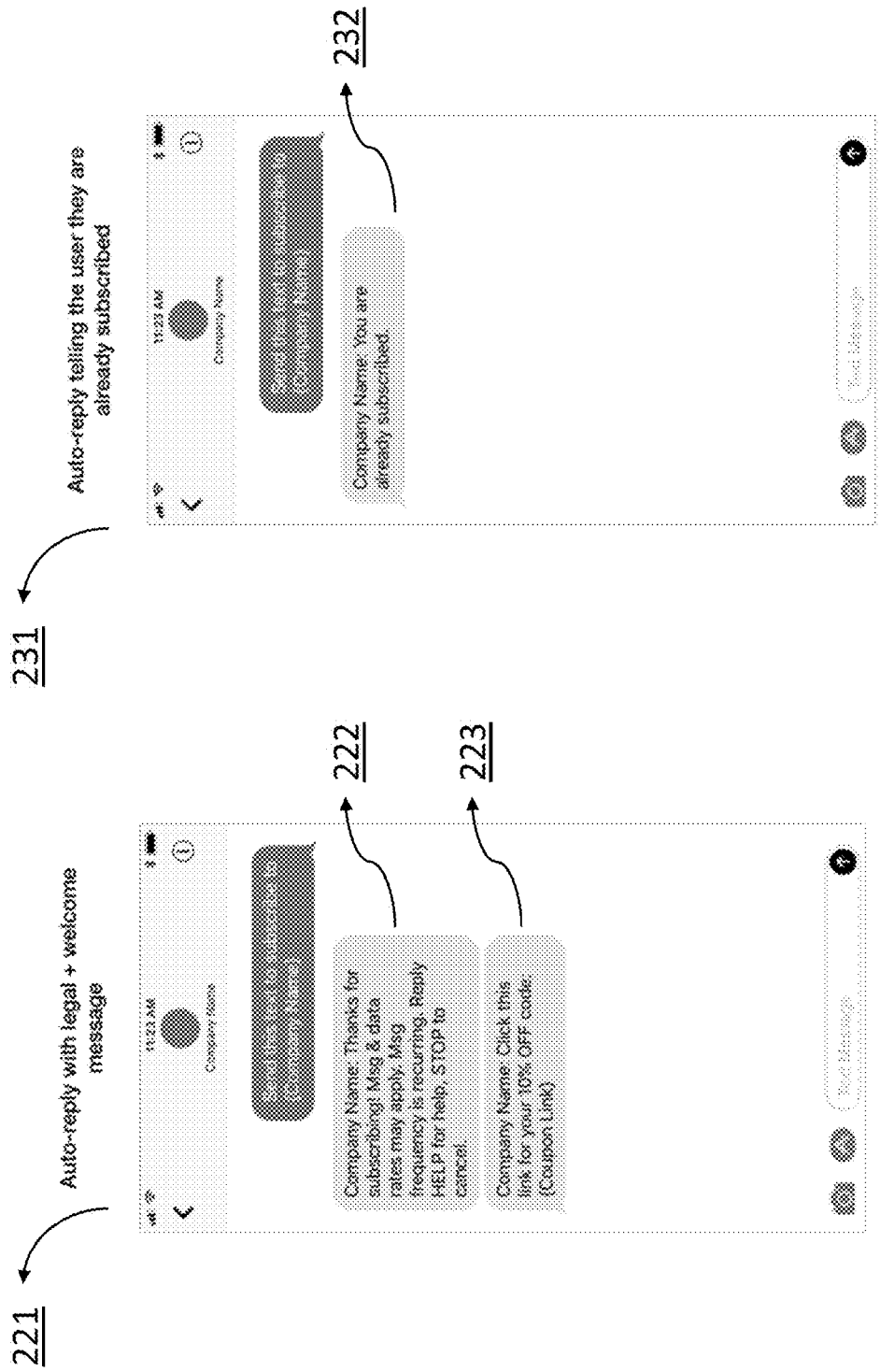

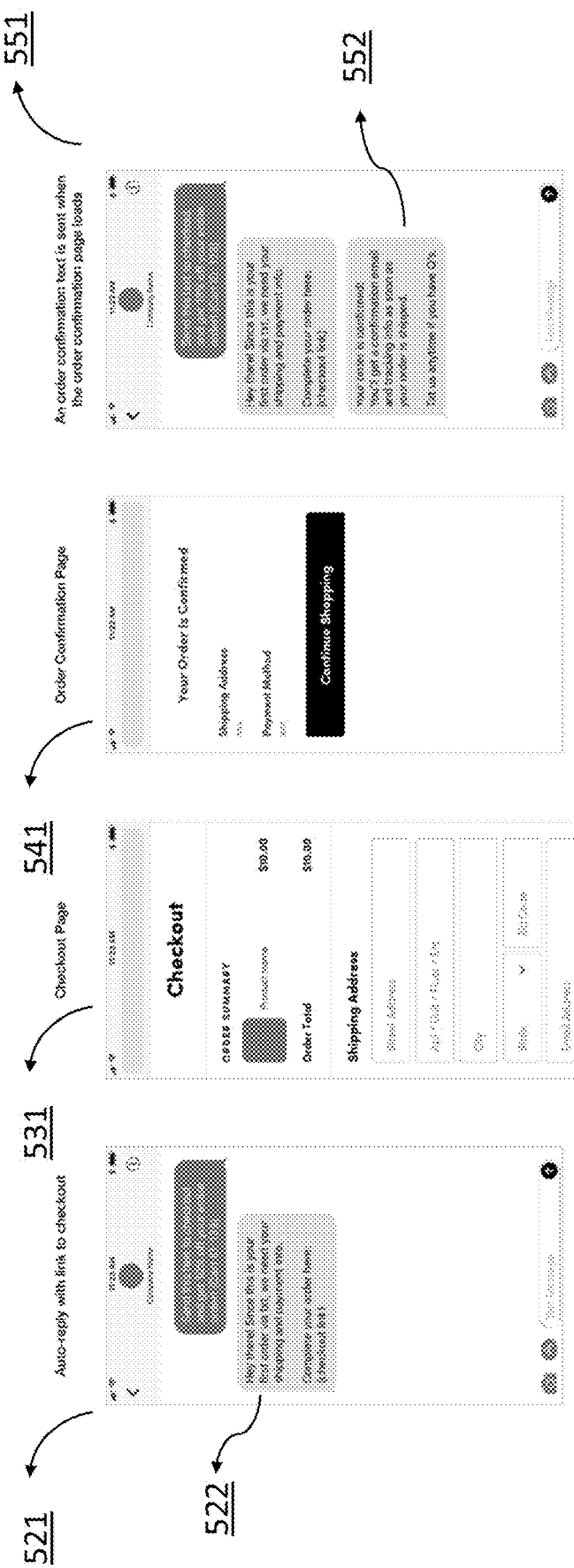

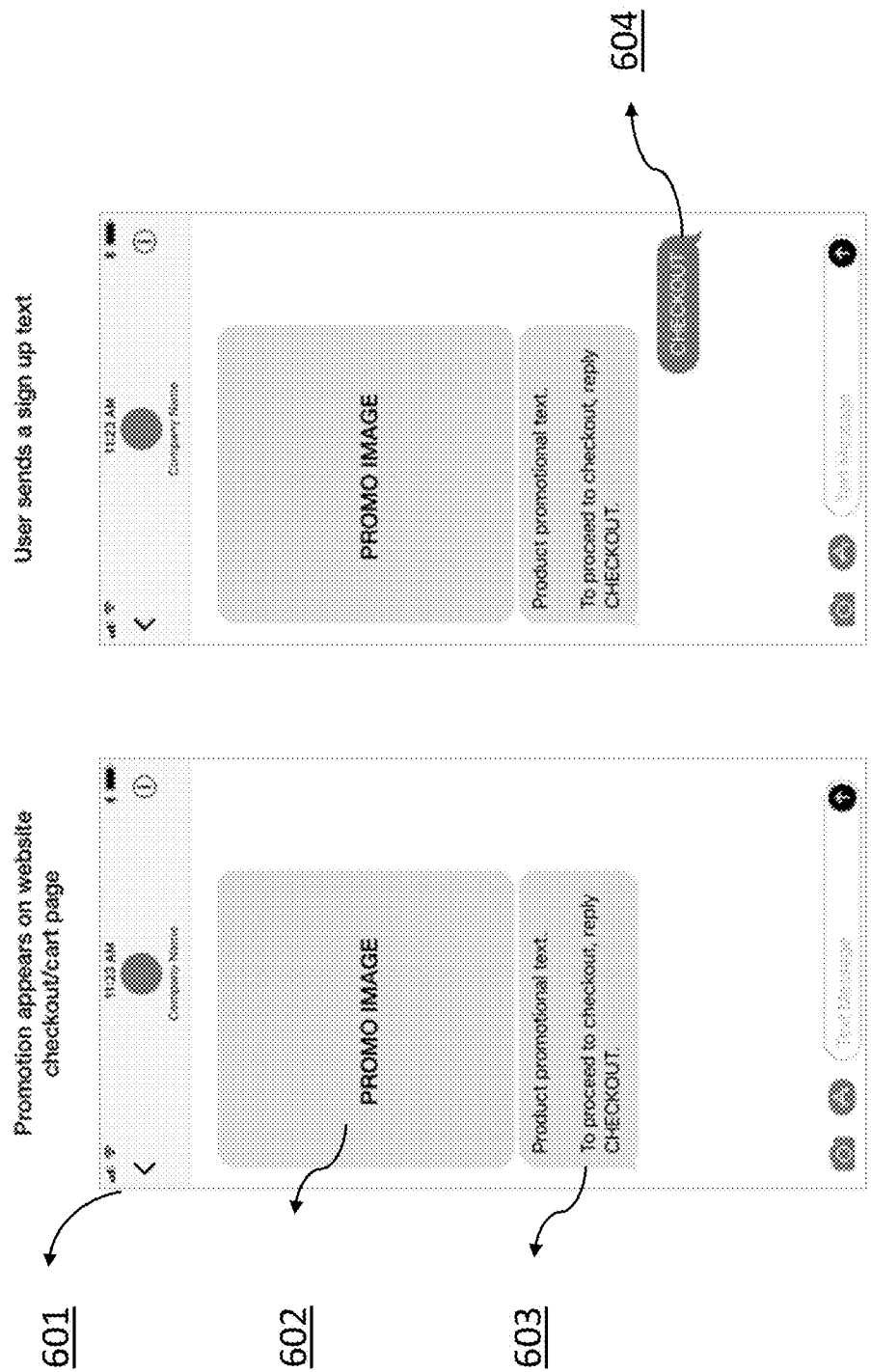

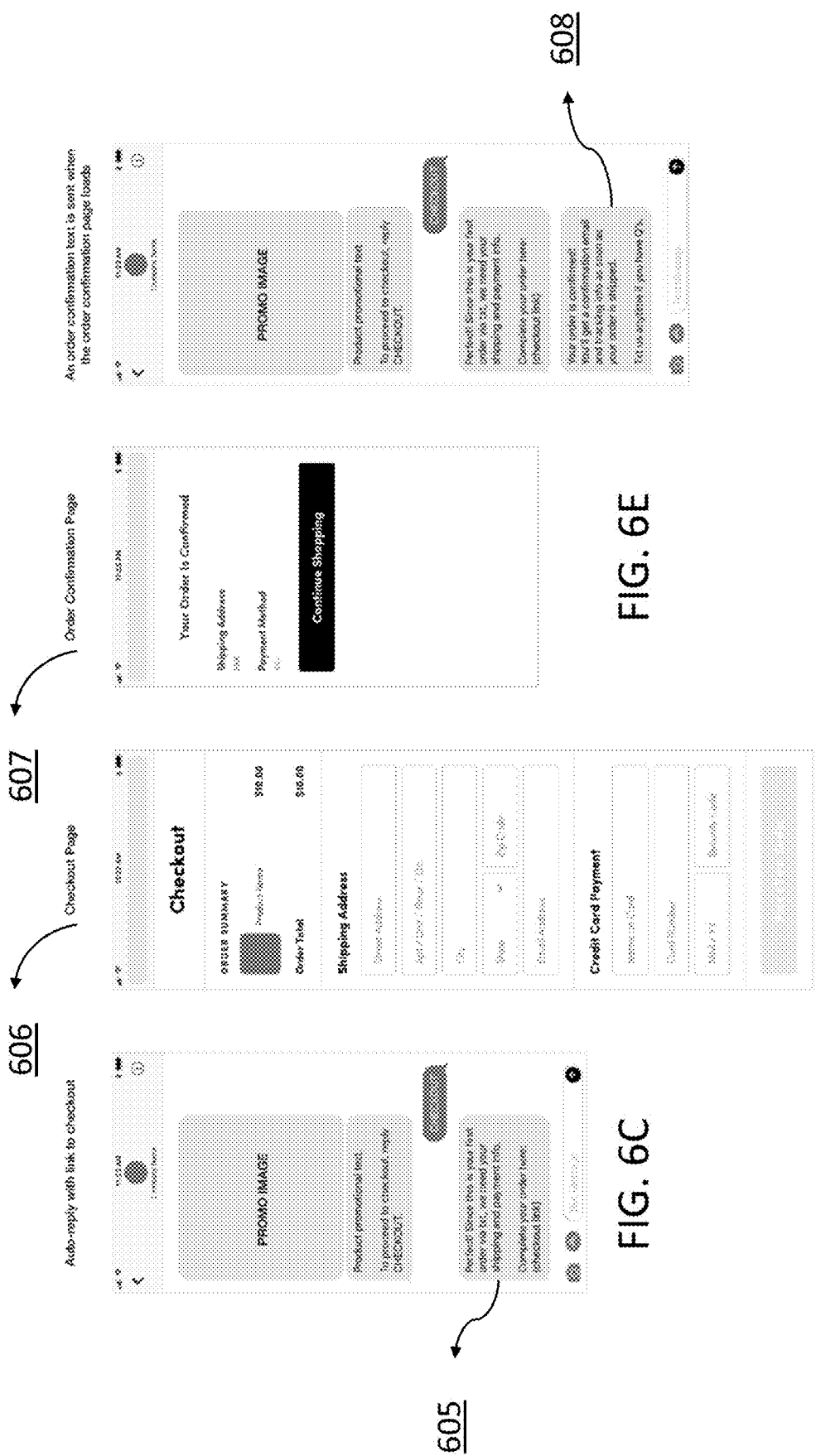

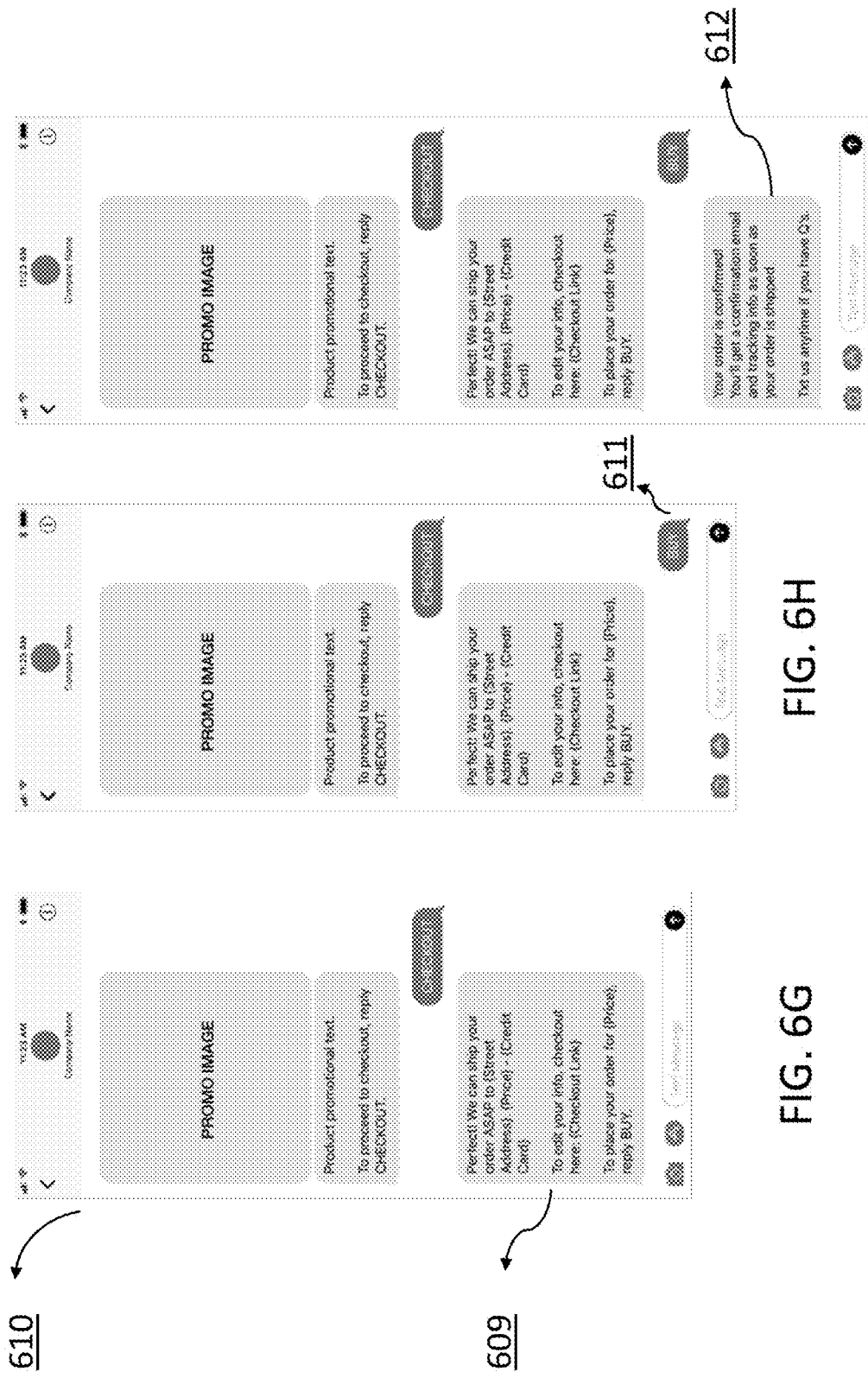

US 11,935,068 B1

METHODS AND APPARATUS FOR MOBILE DEVICE MESSAGING-BASED COMMUNICATIONS USING CUSTOM-GENERATED DEEPLINKS AND BASED ON THE HYPER TEXT TRANSFER PROTOCOL (HTTP)

CROSS-REFERENCE TO RELATED APPLICATIONS

The present application is a continuation of U.S. patent application Ser. No. 17/569,265, filed Jan. 5, 2022 and entitled Methods and Apparatus for Mobile Device Messaging-Based Communications Using Custom-Generated Deeplinks and Based on the Hyper Text Transfer Protocol (HTTP)," the entire contents of which are hereby incorporated by reference. U.S. patent application Ser. No. 17/569,265 is a continuation of U.S. patent application Ser. No. 17/496,590 filed Oct. 7, 2021 and entitled "Methods and Apparatus for Dynamic Application Deeplinking at a Mobile Electronic Device," which is a continuation of U.S. patent application Ser. No. 15/986,569 filed May 22, 2018 and entitled "A Technology Platform for Messaging-Based Subscriptions and Payments Initiated From a Mobile Website," which claims the benefit of and priority to U.S. Provisional Patent Application No. 62/511,413 filed May 26, 2017 and entitled "A Technology Platform for Messaging-Based Subscriptions and Payments Initiated From a Mobile Website."

BACKGROUND

Some embodiments described herein relate generally to computer-related technologies for mobile electronic devices. In particular, some embodiments described herein relate to methods and apparatus for mobile device messaging-based communications using custom-generated deeplinks and based on the Hyper Text Transfer Protocol (HTTP).

Known methods allow a user to open a vendor's application or a vendor's website on a mobile device to select a product or service. The user can then provide payment information via the vendor's application or website to complete a transaction with the vendor. With these known methods, however, the user often pauses its previous activities (e.g., viewing a website, reading an email) on the mobile device and is redirected to the vendor's application or website to purchase the products and services via many user input (e.g., clicks, or screen taps). This time-consuming and burdensome process results in many users leaving the purchase before the transaction is completed.

Accordingly, a need exists for methods and apparatus for dynamic application deeplinking to transition from one user interface to another user interface at a mobile device for continued and improved user experience and engagement when interacting with the mobile device.

SUMMARY

In some embodiments, a method includes, in response to an integration tag included in a webpage at a first user interface being executed at a mobile device, receiving, at a processor remote from the mobile device, (1) a mobile device identifier associated with the mobile device, and (2) a request to retrieve a purchase identifier associated with the integration tag and a set of configurable settings associated with the integration tag. The method includes in response to a loading status of the webpage including the integration tag satisfying a criteria, sending, from the processor to the mobile device and based on the mobile device identifier, a first signal causing a frame to be provided within the webpage at the first user interface of the mobile device and based on the set of configurable settings, the frame associated with the purchase identifier. The method includes in response to a first user input associated with the frame entered by a user via the mobile device, receiving, at the processor, a Hyper Text Transfer Protocol (HTTP) POST request from the mobile device. The method includes determining, at the processor and based on the HTTP POST request and the mobile device identifier, a uniform resource identifier (URI) defined to cause a second user interface at the mobile device to render at the mobile device. The URI of the second user interface is compatible with a first operating system and not a second operating system different from the first operating system. The mobile device is operable with the first operating system and not the second operating system. The second user interface is different from the first user interface. The method includes retrieving purchase information and sending a HTTP response message including the URI of the second user interface and the purchase information to deeplink to the second user interface and to cause the second user interface to be rendered at the mobile device with the purchase information pre-populated in an input field of a text message for the user to initiate a purchase via the text message. The method includes sending, from the processor to the mobile device, a second signal to initiate the purchase via the second user interface by causing the text message to be sent, upon receiving a second user input within the second user interface.

BRIEF DESCRIPTION OF THE DRAWINGS

FIGS. 2A-2D illustrate screenshots of user interfaces at a user mobile device in a click-to-text subscription process, according to an embodiment.

FIGS. 5A-5I illustrate screenshots of user interfaces at a user mobile device in a click-to-text purchase process, according to an embodiment.

FIGS. 6A-6I illustrate screenshots of a user interface at a user mobile device in a click-to-text purchase process, according to an embodiment.

DETAILED DESCRIPTION

Figure 1:
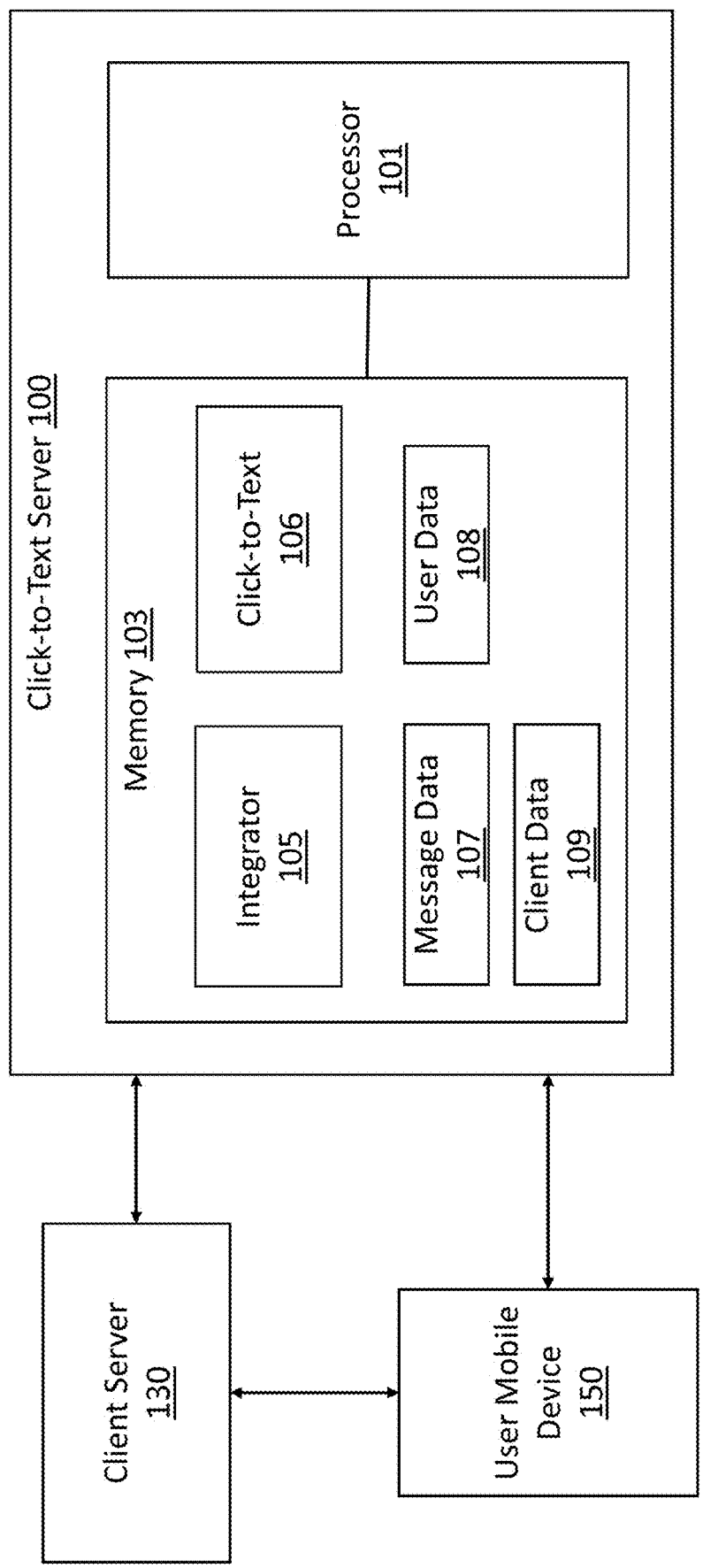
FIG. 1 is a block diagram illustrating a click-to-text server, a client's server and a user's mobile device, according to an embodiment.

Some embodiments described herein include methods and apparatus for a technology platform for messaging-based subscriptions and payments initiated from a website viewed on a mobile device or a mobile application. By using custom-generated dynamic deeplinks, some embodiments described herein provide a method of completing mobile subscriptions, communications, and/or purchases. In these embodiments, a number of mobile interfaces can be used including, but not limited to, mobile websites, mobile applications, mobile messages, mobile advertisements, social media applications, and/or the like. In some implementations, the platform allows a user to initiate a subscription via messaging-based communications, or completes a purchase transaction for a product or service using messaging-based communications. In some implementations, custom-generated mobile deeplinks are used. In some implementations, the purchase and/or subscription process can be initiated via a rendered link on a touchscreen mobile device, and a transaction can be completed by two touch screen taps (or Two-Taps).

In some embodiments, a link can be generated in a set of mobile user interfaces including, but not limited to, a mobile website, a mobile application, a link, an email, a mobile advertisement, a text message, and/or the like. When the link is clicked, a custom-rendered deeplink is initiated, and a mobile messaging application is opened on a user's mobile device. In some embodiments, a deeplink is a type of link used in mobile applications that allows the linking of one mobile application to another mobile application. In some implementations, deep linking uses a uniform resource identifier (URI) that links to a mobile application or a specific location within a mobile application. Deeplinks can be used across a set of mobile operating systems including, for example, the Apple® iOS system and the Android™ system.

In some implementations, the content of the message and the recipient's (e.g., the vendor's) phone number can be pre-filled in the messaging application of the mobile device. This information can be communicated to the messaging application using the deeplink specific to the vendor.

In some implementations, the user can switch from, for example, a mobile website, a mobile application, a link, an email, a mobile advertisement, a text message to a subscription message or a purchase message on a mobile messaging application. In some implementations, the mobile device can receive user's selections to subscribe to and/or purchase a good or service via two touch screen taps on a touch screen mobile device. The mobile device can receive a first signal in response to the user selecting (or tapping) on the rendered link on a first mobile user interface (i.e., the first touch screen tap), and the mobile device can receive a second signal in response to the user selecting (or tapping) the "send" message button on a second mobile interface to send the message to the vendor (i.e., the second touch screen tap.) In such implementations, the mobile device receives the user's selections (touch screen tap) via the touch screen of mobile device and then produces a signal to represent the user's selections for further processing by the mobile messaging application.

In some implementations, the user can be subscribed to service to receive messaging based marketing information from the recipient when the message is sent. In some implementations, the user can initiate a process to purchase a product or service from the recipient when the message is sent.

In some embodiments, a method includes receiving a purchase identifier by a processor and in response to a signal generated by the mobile device in response to an input entered by a user at a first user interface of a mobile device. The input is associated with a frame within a page displayed at the first user interface. The method further includes receiving purchase information associated with the purchase identifier and determining a uniform resource identifier (URI) of a second user interface at the mobile device. The second user interface is different from the first user interface. The method includes sending a signal, based on the URI, to cause the second user interface to be rendered at the mobile device with the purchase information pre-populated to fulfill a purchase requested by the user.

In some embodiments, a method includes determining a state of a page load of a page at a first user interface of a mobile device. In response to the state of the page load satisfying a criteria, the method includes providing, based on a set of configurable settings, a frame within the page at the first user interface. The frame includes purchase information and deeplink information such that in response to an input associated with the frame entered by a user, a second user interface is provided at the mobile device with the purchase information pre-populated for the user to initiate a purchase.

In some embodiments, a processor-readable non-transitory medium storing code representing instructions to be executed by a processor, the code includes code to cause the processor to determine a state of a page load of a page at a first user interface of a mobile device. The code further includes code to cause the processor to, in response to the state of the page load satisfying a criteria, provide, based on a set of configurable settings, a frame within the page at the first user interface. The frame include purchase information and deeplink information. The code further includes code to cause the processor to receive a purchase identifier in response to an input entered by a user at the frame mobile device and based on the purchase information. The code includes code to cause the processor to determine, based on the deeplink information, a uniform resource identifier (URI) of a second user interface at the mobile device. The second user interface is different from the first user interface. The code includes code to cause the processor to render, based on the URI, the second user interface at the mobile device with the purchase information pre-populated to fulfill a purchase requested by the user.

As used herein, the singular forms "a," "an" and "the" include plural referents unless the context clearly dictates otherwise. Thus, for example, the term "a message" is intended to mean a single message or a combination of messages. For another example, "a purchase identifier" is intended to mean a single purchase identifier or a combination of purchase identifiers.

As used herein, data can include, for example, information such as videos, audio, text, images, games, usernames, passwords, user input, user clicks, user screen taps, user browsing history, information associated with a user, information associated with a user's mobile device, URLs, banking transaction information (e.g., credit card information, back account information, etc.), healthcare information (e.g., prescription information, healthcare records, etc.), public data, protected data, proprietary data, personal data, private data, user generated content, Internet of Things (IoT) data, autonomous vehicle data (e.g., navigation data, status data, security data, etc.), and/or any other information.

FIG. 1 is a block diagram illustrating a click-to-text server 100, a client's server 130 and a user's mobile device 150, according to an embodiment. The click-to-text server 100 can communicate with the client's server 130 and the user's mobile device 150 via a network (not shown). The network (not shown) can be any network or combination of networks capable of transmitting communication information (e.g., data and/or signals) and can include, for example, a wireless network, a cellular network, a telephone network, an Ethernet network, a fiber-optic network, and/or the like. The communication information can be transmitted over a connection(s) of a wireless network, such as, for example, a Wi-Fi® or wireless local area network ("WLAN") connection, a wireless wide area network ("WWAN") connection, a cellular connection and/or the like. A network connection can be a wired connection such as, for example, an Ethernet connection, a digital subscription line ("DSL") connection, a broadband coaxial connection, and/or a fiber-optic connection and/or the like.

The click-to-text server 100 can be or include a computer, a cell phone, a tablet, an electronic device, a critical embedded systems, coprocessors, field-programmable gate arrays (FPGAs) and/or the like. The click-to-text server 100 can include at least one processor 101 and at least one memory 103. The at least one processor 101 and the at least one memory 103 are operatively coupled with each other. The at least one memory 103 can be, for example, non-volatile memory, volatile memory, memory local to a server or networked, virtualized memory, a random-access memory (RAM) (e.g., a dynamic RAM, a static RAM), a flash memory, a removable memory, and/or so forth. In some embodiments, the memory 103 can store, for example, message data 107 (e.g., a set of promotional messages associated with a set of entities or clients), user data 108 (e.g., user phone number, user device identifier, other information identifying the user or the user mobile device, user viewing history, user click/tap history, user status (a new user or an existing user), user cookies, page referrer URLs, impression data, user agent, and/or the like), client data 109 (e.g., user white list associated with a set of clients/entities, user black list associated with a set of clients/entities, client preferences, client business rules, and/or the like). In some implementations, the memory 103 can store, for example, a database(s), process(es), application(s), virtual machine(s), instructions, and/or other software modules (stored and/or executing in hardware) or hardware modules configured to execute an integrator process and a click-to-text process. In such implementations, instructions for executing the click-to-text process, and/or any associated methods can be stored within the memory 103 and executed at the processor 101. In some embodiments, the memory 103 can store code representing integrator instructions 105 (i.e., integration tag) to be executed by the at least one processor 101 or the user mobile device 150. The execution of the integrator instructions 105 at the user mobile device 150 can cause the user mobile device 150 to send a request to the click-to-text server 100 and receive from the click-to-text server 100 promotional messages associated with the client. In some embodiments, the memory 103 can store code representing click-to-text instructions 106 to be executed by the at least one processor 101 to cause the processor to execute the click-to-text process. In some implementations, at least a portion of the data and instructions stored at the memory 103 can be served from one of a single physical machine, multiple physical machines, a virtualized server, multiple virtualized servers, a public cloud, a private cloud, and/or a geographically distributed network of operatively coupled servers.

The at least one processor 101 can be any hardware module and/or component configured to receive and process data, and/or to execute code representing instructions. In some embodiments, the at least one processor 101 can be a general purpose processor, a Field Programmable Gate Array (FPGA), an Application Specific Integrated Circuit (ASIC), a Digital Signal Processor (DSP), and/or the like. The at least one processor 101 can implement a number of modules and/or server components. The at least one processor 101 can be configured to execute instructions generated by any of its modules and/or server components, and/or instructions stored in the memory 103, for example, the integrator instructions 105 and the click-to-text instructions 106. In some implementations, if the at least one processor 101 includes multiple processors, the modules and/or server components can be distributed among and/or executed by the multiple processors. The at least one memory 103 can be configured to store processor-readable instructions that are accessible and executable by the processor 101.

The client device 130 can be or include a computer, a cell phone, a tablet, an electronic device, a critical embedded systems, coprocessors, and field-programmable gate arrays (FPGAs), a smart TV, and/or another type of network-enabled machine. The client device 130 can include a processor (not shown) and a memory (not shown). In some implementations, the client device 130 is associated with a client (also referred to herein as an entity, a vendor) selling or providing a good(s) or service(s) via the internet, and/or engaging in any marketing activities via the internet. In some implementations, the client device 130 can be served from one of a single physical machine, multiple physical machines, a virtualized server, multiple virtualized servers, a public cloud, a private cloud, and/or a geographically distributed network of operatively coupled servers.

The user mobile device 150 can be any mobile electronic devices. For example, in some embodiments, the user mobile device 150 can be, but are not limited to, a mobile phone, a tablet, a smart watch, a personal computer, a personal digital assistant (PDA), a smart phone, and/or the like. The user mobile device 150 can include a processor (not shown), a memory (not shown), a network interface (not shown), and an output device (not shown). For example, in some embodiments, the output device can be any suitable display that can provide at least a portion of a user interface for a software application (e.g., a mobile application, a PC application, an internet web browser, etc.) installed on (or accessible by) the user mobile device 150. In such embodiments, the display can be, for example, a cathode ray tube (CRT) monitor, a liquid crystal display (LCD) monitor, a light emitting diode (LED) monitor, and/or the like. In other embodiments, the output device can be an audio device, a haptic device, and/or any other suitable output device. In some implementations, the output device can be configured to receive user input via taps (contact) on a touch screen by a user gesture such as a finger tap, swipe, pinch, etc. The network interface of user mobile device 150 can be, for example, a network interface card and/or the like that can include at least an Ethernet port and/or a wireless radio (e.g., a WiFi® radio, a Bluetooth® radio, etc.). The memory of user mobile device 150 can be, for example, a random access memory (RAM), a memory buffer, a hard drive, a read-only memory (ROM), an erasable programmable read-only memory (EPROM), and/or the like. In some embodiments, the memory can include a set of software applications including, but not limited to, a messaging application, a web browser application, an email application, a book reader application, and/or any mobile applications. Each of the set of software applications can have a unique user interface. The processor can be any suitable processing device configured to run or execute a set of instructions or code. For example, the processor of user mobile device 150 can be a general purpose processor, a central processing unit (CPU), an accelerated processing unit (APU), and Application Specific Integrated Circuit (ASIC), and/or the like. The processor can be configured to run or execute a set of instructions or code stored in the memory associated with using, for example, a PC application, a mobile application, an internet web browser, a cellular and/or wireless communication (via a network), and/or the like, as described in further detail herein.

In use, a user can provide a first input (a click, a screen tap, or a selection, etc.) to a web link on a mobile website or a mobile application displayed on the user mobile device 150. This user selection can be sensed by the touch screen of the user mobile device 150 such that a signal is produced and provided to the processor of the user mobile device 150. The web link is associated with a promotional message provided by a client. The client can be an entity selling or providing a good(s) or service(s) via the internet, and/or engaging in any marketing activities via the internet. In response to receiving the signal produced by the touch screen, the processor of user mobile device 150 can produce a notification and send it to the click-to-text server 100. The click-to-text server 100 can receive a notification (e.g., a HTTP POST request) in response to the user input. The click-to-text server 100 can initiate a messaging application at the user mobile device 150 with a message pre-populated with purchase or subscription information and a recipient's phone number. The user can provide a second input (a click, a screen tap, or a selection, etc.) to send the text message to the recipient's phone number. The recipient phone number is associated with the client and the client server 130. In response to sending the text message, the user, via the user mobile device 150, can subscribe to a messaging-based marketing service, or initiate a process of purchasing a product or service, provided by the client and/or the client server 130. In some implementations, this click-to-text process can be completed in just two taps, and in compliance with the Telephone Consumer Protection Act ("TCPA") and the regulations by trade associations representing the wireless communication industry (e.g., CTIA).

FIGS. 2A-2D illustrate screenshots of user interfaces at a user mobile device in a click-to-text subscription process, according to an embodiment. The user mobile device can be structurally and functionally similar to the user mobile device 150 described with regards to FIG. 1. The first user interface 201 displays a promotional message 202 (e.g., within a frame of the first user interface 201) at the user mobile device and provides a "sign-up" link 203, when selected, clicked or tapped by the user, initiating a second user interface 211 at the user mobile device. The promotional message 202 can be any advertising information related to a product or service that a client provides. The client can provide the product(s) or the service(s) for free or a fee. In some implementations, the first user interface 201 can be within or part of a website browser, an email application, a book reader application, a messaging application, and/or any mobile application or user interfaces at the user mobile device. The second user interface 211 can be within or part of a messaging application, and/or the like. In response to user selections, clicks or taps at the "sign up" link 203, the second user interface 211 of a mobile application, for example, a messaging application, opens with a message pre-populated with a subscription request 213. The message also re-populates the phone number 214 of a client associated with the promotional message 202. In some implementations, the content of the message 213 and/or the phone number 214 can be customized (or defined or populated), based on client's preferences, by a click-to-text server (such as the click-to-text server 100 described with regards to FIG. 1). In some instances, the phone number 214 can be a short code cellular number or a long code cellular number. In some instances, the content of the message 213 can be related to, for example, a request to join a subscription list, a request to purchase a product or service, a request for customer service, or any number of other ways in which the user mobile device interacts with the client server. In some implementations, the message 213 and the phone number 214 are fixed and cannot be changed by the user. In other implementations, the user has an option to change the content of the pre-populated message 213 and/or the phone number 214. The user can select, click or tap the "send" button 212 to send the message 213 to the client associated with the phone number 214. The message 213 can be sent to a client server (such as the client server 130 described with regards to FIG. 1) and/or the click-to-text server. In response to receiving the message 213, the client server can send a message(s) 222 via the second user interface 221 (the same second user interface shown as 211 in FIG. 2B; e.g., a messaging application) to confirm the user's subscription. In some implementations, the click-to-text server can send message 222 to confirm the user's subscription.

In some implementations, in response to receiving the message 213, the click-to-text server can authenticate the user based on a user identifier. In some implementations, the user identifier can be included in the signal sent to the click-to-text server in response to receiving the message 213. In other implementations, the click-to-text server can receive the user identifier prior to receiving the message 213. In such implementations, the click-to-text server can receive the user identifier in response to an execution of an integration tag (such as the integrator instructions 105 as described with regards to FIG. 1) during a page load event at the user mobile device. The user identifier can include, but are not limited to, a user phone number, a sender phone number, a device identifier of the user mobile device, and/or other information identifying the user or the user mobile device. In some implementations, the click-to-text server can determine if the user is on a black list or on a white list associated with the client. If the user is on a black list of the client, the click-to-text server can block the user from subscribing to the service provided by the client and/or the promotional messages 223 provided by the client. If the user is not on a black list of the client, or if the user is on a white list of the client, the user is authenticated by the click-to-text server and/or the client server and the click-to-text server and/or the client server can provide service and/or send promotional messages 223 to the user. In some implementations, data representing the black list and/or the white list associated with the client can be stored in a client database of the click-to-text server (such as the client data 109 in the memory 103 of the click-to-text server 100 described with regards to FIG. 1).

In some implementations, the click-to-text server can determine, based on the user identifier, if the user is a new subscriber of the client or an existing subscriber of the client. If the user is a new subscriber, the client server and/or the click-to-text server can send a message(s) 222 via the second user interface 221 (the same second user interface shown as 211 in FIG. 2B; e.g., a messaging application) to confirm the user's subscription. If the user is an existing subscriber, the client server and/or the click-to-text server can send a message(s) 232 informing the user that the user is already subscribed to the client's service. In some implementations, the user's subscription status associated with the client (e.g., a new subscriber or an existing subscriber) can be stored in a user database of the click-to-text server (such as the user data 108 in the memory 103 of the click-to-text server 100 described with regards to FIG. 1).

In some implementations, the second user interface 211 is different from the first user interface 201. In some implementations, the second user interface 211 (e.g., a messaging application) is not a user interface provided by the client/entity/vendor from which the purchase/subscription is to be made. In some implementations, the first user interface 201 is not a user interface (e.g., a web browser) provided by the client/entity/vendor from which the purchase/subscription is to be made. In other words, a user does not need to install the vendor's mobile application to make the purchase from the vendor or subscribe to service provided by the vendor. In situations where, for example, the user is browsing a website with a promotional message 202, the user can select, tap or click the "sign-up" link 203 and a messaging application (e.g., 211) is opened with a message 213 and a phone number 214 pre-populated to complete the purchase/subscription. In such situations, the user does not need to install or open any vendor application. Stated differently, the user can initiate the purchase/subscription upon providing a single user input within the second user interface (e.g., click "send" button at the messaging application) and without further interaction with a user interface associated with a vendor from which the purchase is to be made. The click-to-text process provides dynamic application deeplinking at a mobile device such that the user's interaction with a client via a first user interface of the mobile device can continue to a second user interface of the mobile device. The dynamic application deeplinking protocol improves the user experience for shopping and interacting, via a network, with a client via the mobile device and increases customer engagement with the promotional messages/marketing efforts by the client.

In some implementations, in response to the user selecting, clicking or tapping the "sign-up" link 203 via the first user interface 201, the user mobile device can send a HTTP POST request to the client-to-text server notifying the client-to-text server of the user's select/click/tap on the "sign-up" link 203. The HTTP POST request can include, for example, a purchase identifier associated with the promotional message 202, a purchase identifier associated with the client or the entity providing the promotional message 202 (e.g., a telephone number associated with the client/entity), purchase information associated with the promotional message, a user identifier (e.g., a user phone number, a user mobile device identifier, user impression data, a user agent field collected by the web browser, and/or any information identifying the user and/or user mobile device), and/or the like. The purchase information can include, for example, a subscription to service associated with the promotional message 202, information related to the product(s) or service(s) associated with the promotional message 202, a product identifier, a subscription identifier, and/or the like. An example HTTP form that POSTs to the client-to-text server is as follows:

```
<form action="/l/clicks" method="post" target="_top">
  <input type="hidden" name="i" value="{impressionId}"></input>
  <input type="hidden" name="id" value="{userId}"></input>
  <button type="submit" className={'${css.formSubmitButton} ${css.override}'}>
    <svg viewBox='0 0 24 24' className={'${css.clickToTextPhoneIcon} ${css.override}' }>
      <path d='M16.3,0H7.7C6.8,0,6,0.9,6,1.9v20.1C6,23.1,
        6.8,24,7.7,24h8.6c0.9,0,1.7-0.9,1.7-1.9V1.9C18,0.9,
        17.2,0,16.3,0z M10.8,1.2h2.4c0.2,0,0.3,0.2,0.3,0.4c0,
        0.2-0.1,0.4-0.3,0.4h-2.4c-0.2,0-0.3-0.2-0.3-0.4C10.5,
        1.4,10.6,1.2,10.8,1.2z M12,23.2c-0.4,0-0.8-0.4-0.8-
        0.8c0-0.4,0.3-0.8,0.8-0.8s0.8,0.4,0.8,0.8C12.8,22.9,
        12.4,23.2,12,23.2z M16.9,20.9H7.1V3.1h9.8V20.9z'
    />
    </svg>
    <svg className={'${css.clickToTextRightArrow} ${css.override}'}viewBox='0 0 24 24'>
      <polygon points='18.5,12 7.5,24 5.5,22.1 14.8,12 5.5,
        1.9 7.5,0'/>
    </svg>
    <div className={'${css.clickToText} ${css.override}' }>
      <div className={'${css.text1} ${css.override}' }>{ctaText1}</div>
      <div className={'${css.text2} ${css.override}'}>{ctaText2}</div>
    </div>
  </button>
</form>
```

In response to receiving the HTTP request from the user mobile device, the client-to-text server can determine, based on a mobile device identifier, a uniform resource identifier (URI) (including, for example, a link syntax) of a second user interface at the user mobile device. In some implementations, the mobile device identifier can be a user agent field collected by the web browser, a platform type or an operating system type operated at the user mobile device. In some instances, the platform type is the operating system type operated at the user mobile device or information included in the user agent field collected by the web browser. The client-to-text server can determine the URI of the second user interface that is compatible with the operating system type of the user mobile device. The URI of the second user interface (e.g., a messaging application) may be the same or different for different mobile device operating systems. The client-to-text server can generate a response message including the URI of the second user interface and send the response message to the user mobile device to cause the second user interface to open with message and phone number pre-populated. The click-to-text server can receive the pre-populated message and phone number based on the purchase identifier from a database at the click-to-text server. In some implementations, the response message can be a HTTP 303 status code. In some implementations, the response message and the HTTP form that POSTs to the client-to-text server can be stored in the memory of the client-to-text server (e.g., the click-to-text 106 stored at the memory 103 of the client-to-text server 100.) In some implementations, a proper deeplinking (e.g., the HTTP POST request and the response message) can direct the user to the native text messaging application, enabling the two-tap signup. An example response message sent from the client-to-text server is as follows.

```
public class CreativeController {
  @Path(value="/clicks", method=Method.POST)
  public void click(Request request, Response response) {
    // When POSTing to this endpoint, the facebook app actually
    // sends two requests—the first with query parameters and then
    // a second without. This check handles the second.
    if (request.getQueryParam("i") null)
      throw new InvalidParameterException("Click must have impression id");
    }
    Impression impression=new Impression( )
    impression.setId(Long.valueOf(request.getQueryParam("i")));
```

```
Creative
    creative=creativeRepository.getImpressionCreative
        (impression);
    if (creative==null)
        throw new InvalidParameterException("invalid
            impression id");
    }
    statsCounter.incrementClickCounter(creative.getId( ));
    if (creative.getPhone( )==null){
        creative.setPhone(defaultPhone);
    }
    Click click=buildClick(request);
    click.setImpression(impression);
    click.setCreative(creative);
    creativeRepository.createClick(click);
    kinesisProducerService.add(click);
    if (request.getQueryParam("r") !=null && request.get-
        QueryParam("r").equals("false")) response.setSta-
        tus(204);
    }else{
        response.setStatus(303);
        response.setHeader("Location", getSmsLink(click,
            request.getUserAgent( )));
    }
}
private String getSmsLink(Click click, UserAgent user-
    Agent) {
    String fullSmsBody=click.getCreative( ).getSms
        Body( )+"(ref: "+click.getFingerprint( )+")";
    if (userAgent.isInstagramIos( )){
        fullSmsBody=fullSmsBody.replace(' ', '_');
    }
    return "sms:"+click.getCreative( ).getPhone( )+user-
        Agent.getSmsDeeplinkDelimiter(    )+"body="+
        fullSmsBody;
    }
}
```

In some implementations, in response to the user selecting, clicking or tapping the "sign-up" link 203 via the first user interface 201, the click-to-text server can dynamically request and receive, from, for example, the client database stored at the memory of the click-to-text server, the client's short code (e.g. 24321), the SMS message body (e.g. "Just send this message to join [Company Name] exclusive insiders, or Just send to purchase this red hat"). The client-to-text server can request and receive a platform specific deeplink (e.g., a URI of the second user interface) that causes the user mobile device's messaging application to be rendered at the user mobile device.

In some implementations, when the user selects/clicks/taps the "send" button via the messaging application to send the message, the message can be sent to the wireless communication provider server (e.g., AT&T, Verizon) of the user mobile device. The wireless communication provider server can then make an application programming interface (API) call to the click-to-text server. The API call can trigger a response message back to the user mobile device with a link to set user's preferences. In some instances, this user preference page can use the same client_domain. attn. tv domain specified in the site integration tag as described below.

In some implementations, the click-to-text server can send an integration tag (or site integration tag, or integrator 105 as described in FIG. 1) to the client server. The integration tag includes code, when executed, cause the user mobile device to send a request to the click-to-text server and receive from the click-to-text server promotional messages associated with the client. Specifically, the integration tag can be attached to a page load event at the user mobile device. When the user is opening a page (e.g., a webpage) associated with the client, the request for the promotional message can be sent to the click-to-text server because the page is integrated with the integration tag provided by the click-to-text server. In some instances, the integration tag is triggered or executed only when the page associated with the client is fully loaded at the user mobile device (i.e., a criteria). In some instances, the integration tag can check the ready state of a page (or a document of the page) and only proceeds when the page is fully ready. In some instances, the site integration tag can be stored in the memory of the click-to-text server (such as the integrator 105 stored at the memory 103 of the click-to-text server 100 as described with regards to FIG. 1.) In some instances, the site integration tag can be stored in a public cloud or a private cloud server.

In response to the execution of the integration tag, the user mobile device can generate a unique visitor identifier and store at least a portion of the integration tag in a local storage of the user mobile device, or as a cookie at the user mobile device. The execution of the integration tag can produce, for example, a HTML, iframe that allows messages to be sent and received between the user mobile device and the click-to-text server. In some implementations, the execution of the integration tag at the user mobile device sends to the click-to-text server user data (e.g., user phone number, user device identifier, other information identifying the user or the user mobile device, user viewing history, user click/tap history, user status (a new user or an existing user), user cookies, page referrer URLs, impression data, a user agent field collected by the web browser, and/or the like). In some implementations, the integration tag can include code that manages, stores, and governs client business rules (e.g., whitelists, blacklists, timeouts, and/or the like). In some implementations, the execution of the integration tag at the user mobile device can send a request to the click-to-text server and receive, from the click-to-text server, promotional messages 202 associated with the client, the client configurable settings/preferences to display the promotional message 202 (e.g., the location of the frame relative to the page, the size of the frame relative to the page, and/or the like.) The user mobile device can then render the frame with the promotional message 202 at its output device. The frame can also include purchase information and deeplink information such that in response to an input entered by the user, the second user interface 211 can be rendered at the mobile device to initiate a purchase/subscription. An example integration tag includes code as follows:

```
<script>
_attentive_domain="example.attn.tv",
function(    ){window._attentive=invoked:!    1,show:
function( ){this.Invoked=!0}};var
t=!1,    e=function(    ){if(document.readyState&&!/
loaded|complete/.test(document.readyState))return=void
setTimeout(e,10);if(!t)return t=!0,void setTimeout(e,50);var
n=document.createElement("script");n.setAttribute
("async", "true"),n.type="text/javascript",n.src="https://cd-
n.attn.tv/loader.js",((document.getElementsByTagName
("head")||[null])[0]||document.getElementsByTagName
("script")    [0].    parentNode).appendChild(n)};
window.addEventListener?window.addEventListener
("load",e,!1):window.attachEvent("onload",e)}
( ),window._attentive.show( );
</script>
```

In some implementations, the integration tag can be customized based on client's preferences. For example, the integration tag can be executed when any webpage associated with the client's website is accessed by the user mobile device. In some instances, the integration tag can be executed only when a webpage from a set of webpages associated with the client's website is accessed by the user mobile device. The set of webpages can be selected via a specific URL slug (e.g., /p/mens_category), a specific rooting (e.g., /p/mens_category /* would cover every page with root of/p/mens_category/, including, for example, /p/mens_categorykshirts/philadephia_phillies/G72 91), a specific query parameter (e.g., clientdomain.com/utm_source=lorem&utm_medium=320b
anner&utm_campaign=ipsum), all pages except a specified page (e.g., execute the integration tag on all pages except the checkout page), and/or the like. In some instances, the integration tag can be customized to be executed only by a set of devices that are on a device whitelist or blacklist (e.g., do or do not show the sign-up link 203 for devices on the whitelist or blacklist.) In some instances, the integration tag can be customized to be executed only for users from a set of countries so that the sign-up link 203 can be shown only to users from a set of countries. In some instances, the integration tag can be customized to be executed based on a referrer whitelist or blacklist (e.g., do/do not show sign-up link 203 for users from particular page referrers (e.g. Facebook, Google, etc).) In some instances, the integration tag can be customized to be executed only after a period of time since the last execution of the integration tag (e.g., a length of time until a sign-up unit is displayed again). In some instances, the integration tag can be customized to be executed only after a period of time since a certain event occurs (e.g., a length of time until a sign-up link is displayed again if the user subscribes or makes a purchase, a length of time until a sign-up link is displayed again if the user performs any measured action (close, privacy, terms, click, and/or the like.)

In some implementations, in response to a user sending a message to the client's phone number, the click-to-text server can collect data about the user. In some instances, the click-to-text server can collect transaction payment data including, but not limited to, the user's payment information (e.g. credit card information, bank account information, or other information), shipping address, and preferred shipping-related settings. The click-to-text server can use the data collected to provide a user-friendly purchase experience in subsequent transactions. In some instances, the click-to-text server can collect marketing-based data to help the client send improved marketing-related messages to the user. The marketing-based data can include, but not limited to, the type of messages the user prefers to receive, when the user prefers to receive the message, the type of website content the user has viewed, what items the user has previously purchased, and/or the like. In some instances, the click-to-text server can append additional data, directly collected or through a third party that is appended to the user's phone number as a key value. The data can be used, for example, for fraud protection or to disable a recently changed number.

Figures 3A, 3B, 3C, 3D, 3E:
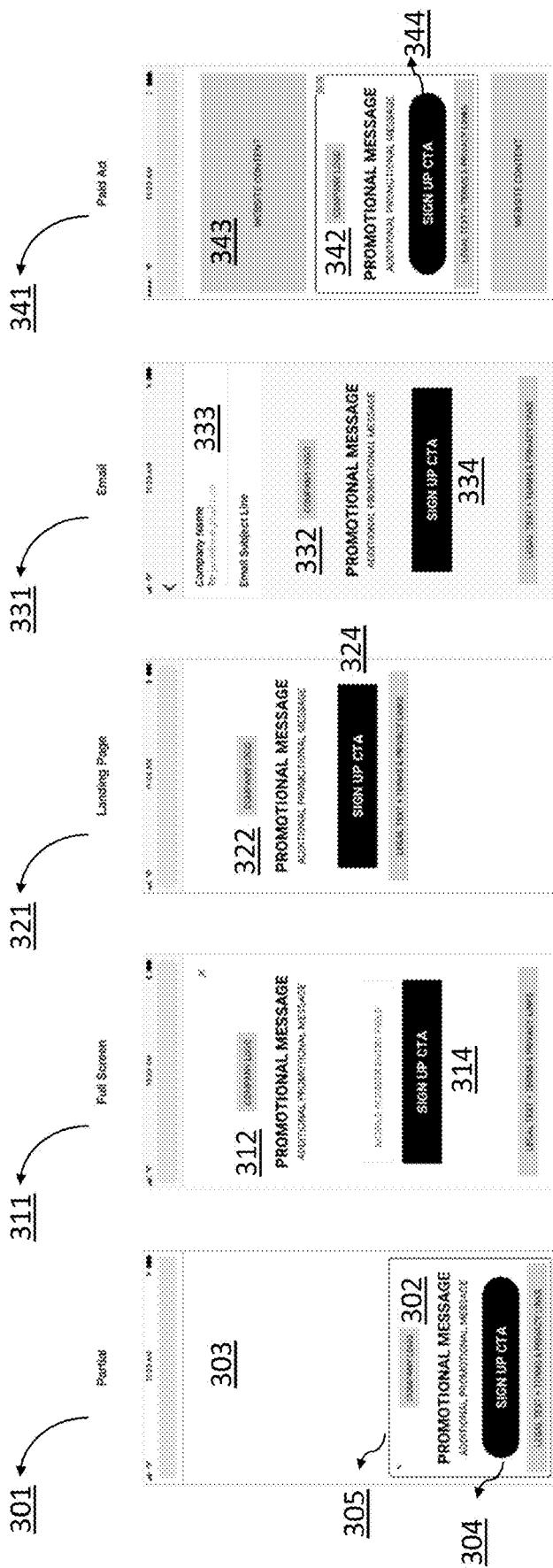
FIGS. 3A-3E illustrate screenshots of user interfaces with a promotional message displayed at a user mobile device, according to an embodiment.

FIGS. 3A-3E illustrate screenshots of user interfaces with a promotional message displayed at a user mobile device, according to an embodiment. The user mobile device can be structurally and functionally similar to the user mobile device 150 described with regards to FIG. 1. Similar to the first user interface with a promotion message described with regards to FIG. 2A, the first user interface 301 displays a promotional message 302 on the screen of the user mobile device as shown in FIG. 3A. The promotional message 302 includes a "sign-up" link 304, when selected, clicked or tapped by the user, initiating a second user interface (not shown here) at the user mobile device. The second user interface of a mobile application (e.g., a messaging application) opens with a message pre-populated with the content and recipient phone number to facilitate a subscription or purchase process.

As shown in FIG. 3A, the promotional message 302 can be displayed within a frame 305 of a webpage 303. The promotional message can also be displayed in a frame with different sizes relative to the size of the webpage and different location relative to the center of the webpage. For example, as shown in FIG. 3A, the promotional message 302 can be displayed in a frame 305 within the webpage 303 (i.e., a partial take-over). The frame 305 can be displayed at the bottom of the screen 301 and a portion of the webpage 303 can be displayed at the top portion of the screen 301. For another example, as shown in FIG. 3B, the promotional message 312 can be displayed in a frame that has the same size as the size of the webpage (i.e., full screen). The user can close the promotional message and the screen can display the webpage. For another example, as shown in FIG. 3C, the promotional message 322 can be displayed as a webpage or as a landing page of a website. For another example, as shown in FIG. 3D, the promotional message 332 can also be displayed within an email 333. For another example, as shown in FIG. 3E, the promotional message 342 can be displayed in a frame as a pop-up from the webpage 343. A portion of the webpage 343 can be displayed at the top portion of the screen 341 and/or the lower portion of the screen 341. In response to a user selects/click/tap at the "sign-up" links within the promotional messages (302, 312, 322, 332, and 342), a second user interface of a mobile application opens with a message pre-populated with the content and recipient phone number to facilitate a subscription or purchase process.

The promotional messages (302, 312, 322, 332, and 342) can be retrieved from a click-to-text server (such as the click-to-text server 100 described with regards to FIG. 1) in response to an execution of an integration tag. The integration tag includes code, when executed, cause the user mobile device to send a request to the click-to-text server and receive from the click-to-text server promotional messages associated with the client. Specifically, the integration tag can be attached to a page load event at the user mobile device. When the user is opening a page (e.g., a webpage) associated with the client, the request for the promotional message can be sent to the click-to-text server because the page is integrated with (includes or incorporates) the integration tag provided by the click-to-text server. The execution of the integration tag can generate, for example, a HTML iframe which allows messages to be sent and received between the user mobile device and the click-to-text server. In some implementations, the execution of the integration tag at the user mobile device sends to the click-to-text server user data, manages client business rules, client configurable settings to display the promotional message (e.g., the location of the frame relative to the page, the size of the frame relative to the page, and/or the like.)

The "sign-up" link (304, 314, 324, 334, or 344), when selected, clicked or tapped by the user, initiates a second user interface (not shown here) at the user mobile device. The "sign-up" link (304, 314, 324, 334, or 344) can be displayed differently based on client's preferences by the click-to-text server. In some instances, the "sign-up" link (304, 314, 324, 334, or 344) can be shown as a button having different sizes (up to a size of a full screen). In some instances, the "sign-up" link (304, 314, 324, 334, or 344) can be a standalone landing page, or a clickable link (a button, or an image) in line with the text displayed in a webpage, an email, a promotional message (302, 312, 322, 332, and 342), a mobile application, a pop-up window, and/or the like.

Figures 4A, 4B:
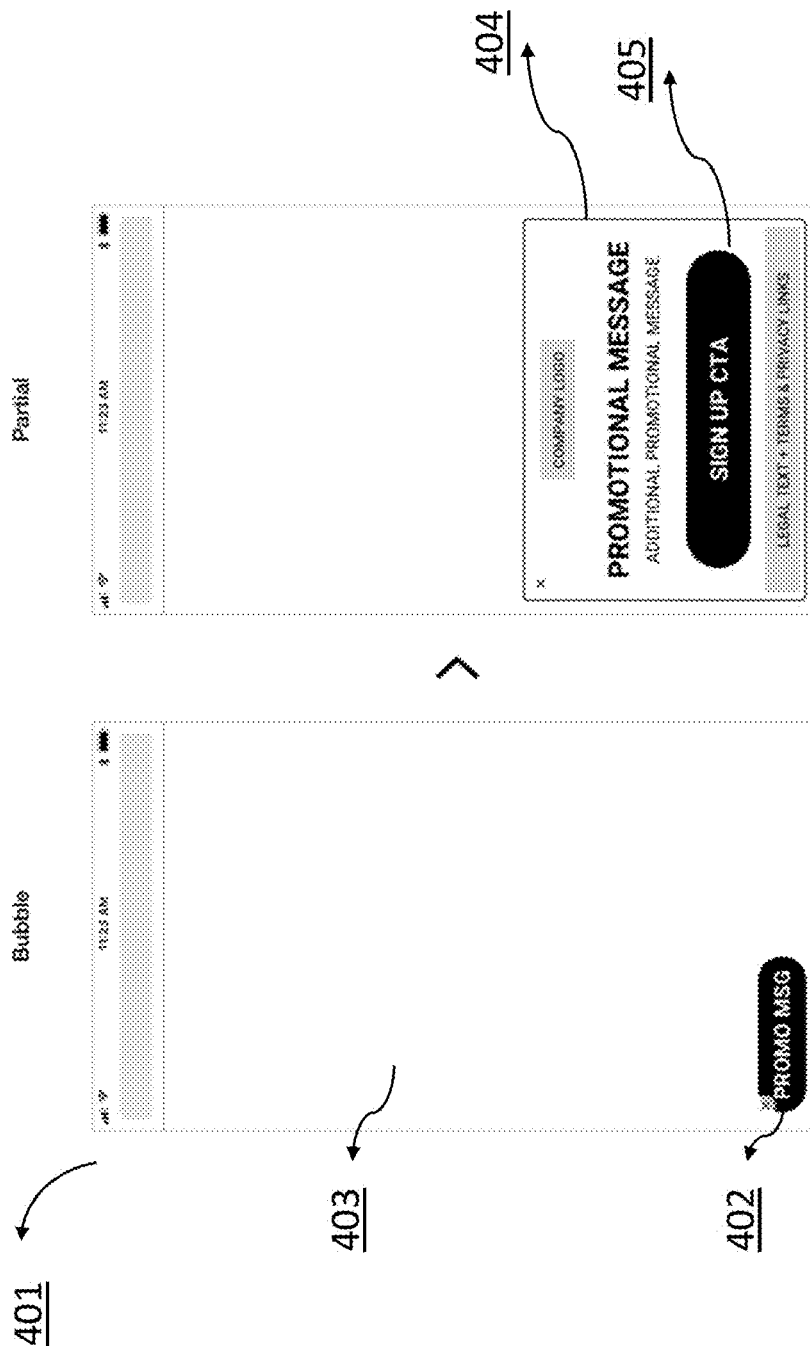
FIGS. 4A-4B illustrate screenshots of user interfaces with a promotional message displayed at a user mobile device, according to an embodiment.
Figure 5B:
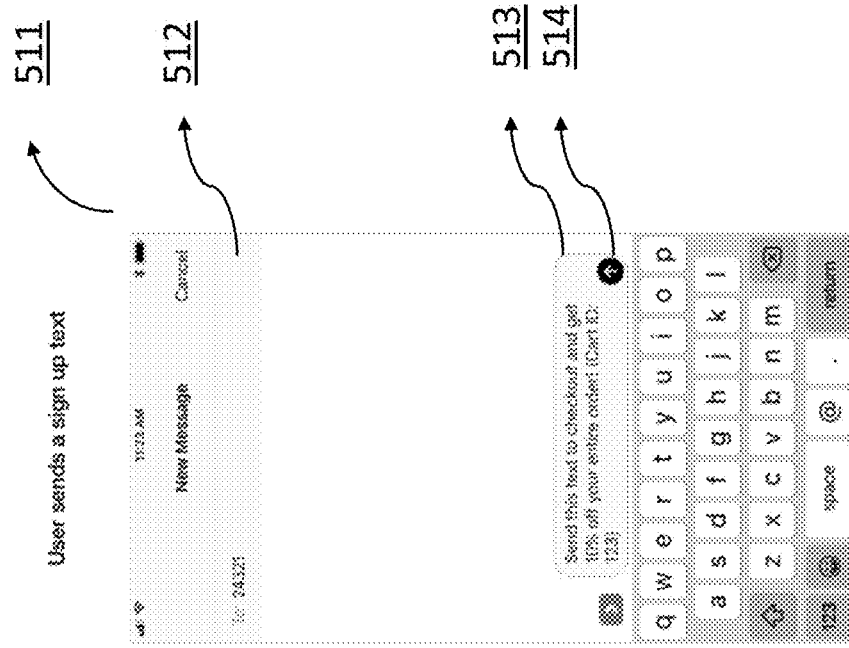
Figure 5A:
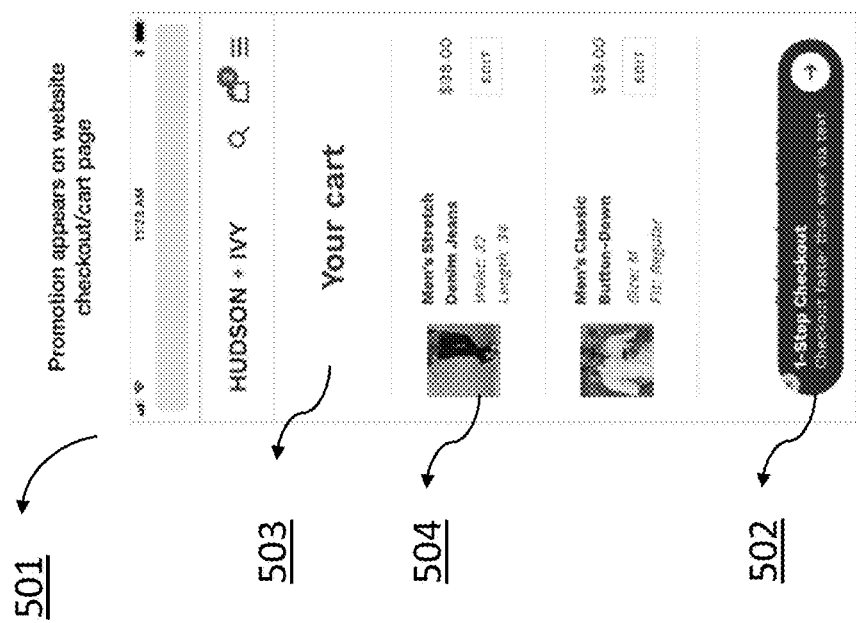
Figure 5G:
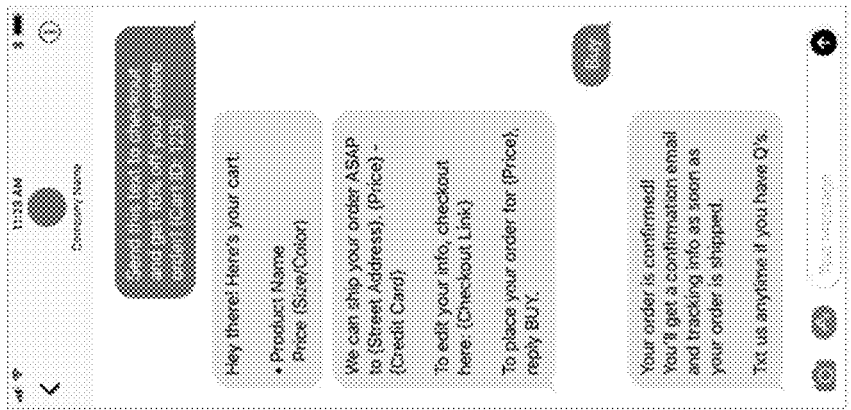
Figure 5H:
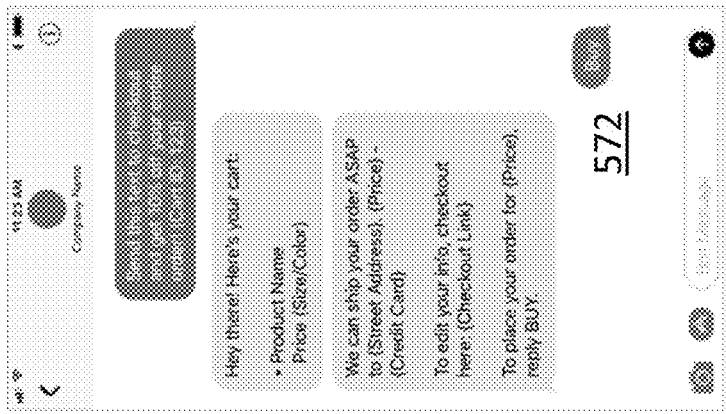
Figure 5I:
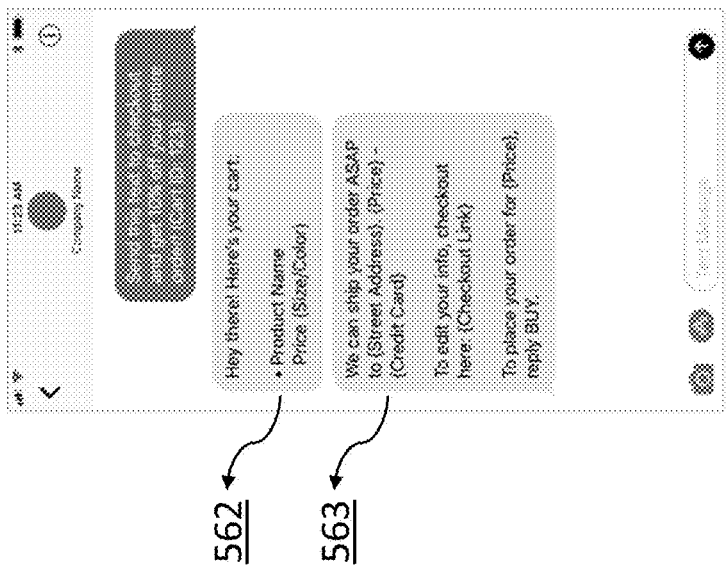

FIGS. 4A-4B illustrate screenshots of user interfaces with a promotional message displayed at a user mobile device, according to an embodiment. In some implementations, the first user interface 401 at the user mobile device displays a promotional bubble 402 that can expand into a promotional message 404 in response to a user select/click/tap at the promotional bubble 402. The promotional message 404 can be similar to the promotional messages (302, 312, 322, 332, and 342) shown in FIGS. 3A-3E. The promotional message 404 includes a "sign-up" link 405, when selected, clicked or tapped by the user, initiating a second user interface (not shown here) at the user mobile device. The second user interface of a mobile application (e.g., a messaging application) opens with a message pre-populated with the content and recipient phone number to facilitate a subscription or purchase process.

FIGS. 5A-5I illustrate screenshots of user interfaces at a user mobile device in a click-to-text purchase process, according to an embodiment. The first user interface 501 (e.g., a website browser) at the user mobile device displays a shopping cart 503 with products 504 to be purchased. The first user interface 501 also displays a promotional message 502, when selected, clicked or tapped by the user, initiating a second user interface 511 at the user mobile device. In some implementations, the first user interface 501 can be a website browser, an email application, a book reader application, a messaging application, and/or any mobile application or user interfaces at the user mobile device. The second user interface 511 can be a messaging application, and/or the like. In response to a user selection, click or tap at the "1-Step Checkout" link 502, the second user interface 511 of a mobile application, for example, a messaging application, opens with a message pre-populated with a purchase request 513. The purchase request 513 can include a shopping cart identifier, a product identifier, a product name, a product description, a price of each product, a total price for the shopping cart, and/or the like. The message also re-populates the phone number 512 of a client associated with the promotional message 502. In some implementations, the content of the message 513 and/or the phone number 512 can be customized, based on client's preferences, by a click-to-text server (such as the click-to-text server 100 described with regards to FIG. 1). The "1-Step Checkout" link 502 can be displayed differently based on client's preferences by the click-to-text server. In some instances, the "1-Step Checkout" link 502 can be shown as a button. The button can have different sizes (up to a size of a full screen). In some instances, the "1-Step Checkout" link 502 can be a standalone landing page, or a clickable link (a button, or an image) in line with the text displayed in a webpage, an email, a promotional message, a mobile application, a pop-up window, and/or the like.

In some instances, the phone number 512 can be a short code cellular number or a long code cellular number. In some implementations, the message 513 and the phone number 512 are fixed and cannot be changed by the user. In other implementations, the user has an option to change the content of the pre-populated message 513 and/or the phone number 512. The user can select, click or tap the "send" button 514 to send the message 513 to the client with the phone number 512. The message 513 can be sent to a client server (such as the client server 130 described with regards to FIG. 1) and/or the click-to-text server.

In some implementations, in response to receiving the message 513, the click-to-text server can authenticate the user based on a user identifier. The user identifier can include, but are not limited to, a user phone number, a sender phone number, a device identifier of the user mobile device, and/or other information identifying the user or the user mobile device. In some implementations, the click-to-text server can determine if the user is on a black list or on a white list associated with the client. In some implementations, the click-to-text server can determine, based on the user identifier, if the user is a new customer of the client or an existing customer of the client. If the user is a new customer, the client server and/or the click-to-text server can send a message(s) 522 via the second user interface 521 (e.g., a messaging application) to request shipping information and payment information. The message 522 can also include a link ("checkout link") that when clicked/tapped, opens a third user interface with a checkout page 531. The third user interface 531 can be the same as the first user interface 501 (e.g., a website browser). Upon receiving the user input on the shipping information and the payment information at the checkout page 531, the third user interface 541 can display an order confirmation page. The client server and/or the click-to-text server can send a message(s) 552 via the second user interface 551 confirming the order has been placed.

If the user is an existing customer of the client, the client server and/or the click-to-text server can send, via the second user interface, a message(s) 562 including the product information in the shopping cart, and a message 563 informing the user of the shipping information and the payment information on file associated with the user. In some implementations, the message 563 can include a link ("checkout link") that, when selected/clicked/tapped, opens a third user interface (not shown) that shows a checkout page in which the user can change the shipping information and the payment information. In some implementations, the user can send, via the second user interface, a message 572 to confirm the purchase, the payment information and the shipping information. Upon receiving the message 572 from the client, the client server and/or the click-to-text server can send, via the second user interface, a message 582 confirming the order has been placed. In some implementations, the user's purchase history associated with the client (e.g., a new/existing customer, previous orders, previous shopping carts, user payment information, user shipping information, and/or the like) can be stored in a user database of the click-to-text server (such as the user data 108 in the memory 103 of the click-to-text server 100 described with regards to FIG. 1).

Similar to the click-to-text subscription process described with regards to FIGS. 2A-2D, the click-to-text server can implement the integration tag at the client's server in the click-to-text purchase process. The integration tag includes code, when executed, cause the user mobile device to send a request to the click-to-text server for promotional messages associated with the client. Specifically, the integration tag can be attached to a page load event at the user mobile device. When the user is opening a page (e.g., a webpage) associated with the client, the request for the promotional message can be send to the click-to-text server because the page is integrated with the integration tag provided by the click-to-text server. The execution of the integration tag can collect user data (e.g., user phone number, user device identifier, other information identifying the user or the user mobile device, user viewing history, user click/tap history, user status (a new user or an existing user), user cookies, page referrer URLs, impression data, a user agent field collected by the web browser, and/or the like). The integration tag can include code that manages, stores, and governs client business rules (e.g., whitelists, blacklists, timeouts, and/or the like). The execution of the integration tag at the user mobile device can send a request to the click-to-text server and receive, from the click-to-text server, promotional messages associated with the client, the client configurable settings/preferences to display the promotional message.

FIGS. 6A-6I illustrate screenshots of a user interface at a user mobile device in a click-to-text purchase process, according to an embodiment. The click-to-text purchase process can be completed via a single user interface (e.g., a messaging application) at the user mobile device. The second user interface 601 can display a promotional image 602 and a promotional message 603. The second user interface 601 can receive a message 604 from the user instructing the click-to-text server to initiate the "checkout" process. In response to receiving the message 604 from the user, in some implementations, the click-to-text server can authenticate the user based on a user identifier. The user identifier can include, but are not limited to, a user phone number, a sender phone number, a device identifier of the user mobile device, and/or other information identifying the user or the user mobile device. In some implementations, the click-to-text server can determine if the user is on a black list or on a white list associated with the client. In some implementations, the click-to-text server can determine, based on the user identifier, if the user is a new customer of the client or an existing customer of the client. If the user is a new customer, the client server and/or the click-to-text server can send a message(s) 605 via the second user interface to request shipping information and payment information. The message 605 can also include a link ("checkout link") that when clicked/tapped, opens a first user interface with a checkout page 606. In some instances, the first user interface (e.g., a messaging application) can be the same as the second user interface. In some instances, the first user interface (e.g., a website browser) can be different from the second user interface. Upon receiving the user input on the shipping information and the payment information at the checkout page 606, the first user interface 607 can display an order confirmation page. The client server and/or the click-to-text server can send a message(s) 608 via the second user interface confirming the order has been placed.

If the user is an existing customer of the client, the client server and/or the click-to-text server can send, via the second user interface 610, a message(s) 609 including the product information in the shopping cart, the shipping information and the payment information on file associated with the user. In some implementations, the message 609 can include a link ("checkout link") that, when clicked/tapped, opens a second user interface (not shown) that shows a checkout page in which the user can change the shipping information and the payment information. In some implementations, the user can send, via the second user interface, a message 611 to confirm the purchase, the payment information and the shipping information. Upon receiving the message 611 from the client, the client server and/or the click-to-text server can send, via the second user interface, a message 612 confirming the order has been placed. In some implementations, the user's purchase history associated with the client (e.g., a new/existing customer, previous orders, previous shopping carts, user payment information, user shipping information, and/or the like) can be stored in a user database of the click-to-text server (such as the user data 108 in the memory 103 of the click-to-text server 100 described with regards to FIG. 1).

Figure 7:
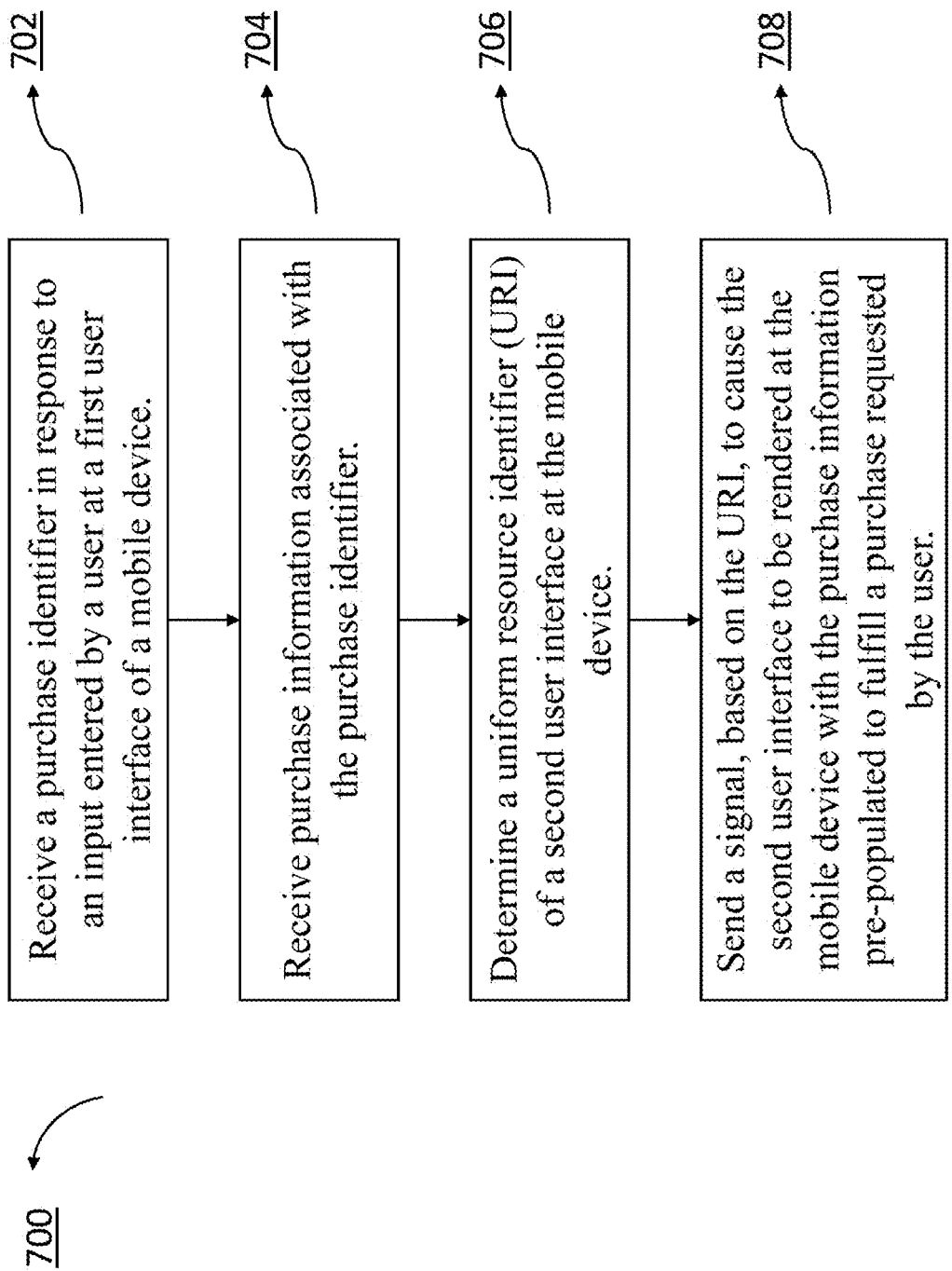
FIG. 7 is a flow chart illustrating a click-to-text process 700, according to an embodiment.

FIG. 7 is a flow chart illustrating a click-to-text process 700, according to an embodiment. The click-to-text process 700 can be executed at, for example, a processor at a server such as the processor 101 of the click-to-text server 100 shown and described with respect to FIG. 1. The server can include, for example, a processor and a memory operatively coupled to the memory. The memory can include, for example, code representing click-to-text instructions (such as the click-to-text instructions 106 described with respect to FIG. 1) to be executed by the at least one processor 101 to cause the processor to execute the click-to-text process 700. Furthermore, the server can be operatively coupled to a network, and in communication with a client server such as the client server 130 and a user mobile device such as the user mobile device 150 shown and described with respect to FIG. 1. The click-to-text subscription process as described with regards to FIGS. 2A-2D and the click-to-text purchase process as described with regards to FIGS. 5A-5I and FIGS. 6A-6I can be implemented using the click-to-text process 700.

At 702, the method includes receiving a purchase identifier in response to an input entered by a user at a first user interface of a mobile device. The first user interface displays a promotional message within a frame of a page at the first user interface. The promotional message can be any advertising information related to a product(s) or service(s) that a client provides. The client can provide the product(s) or the service(s) for free or a fee. In some implementations, the first user interface can be a website browser, an email application, a book reader application, a messaging application, and/or any mobile application or user interfaces at the user mobile device. The location of the frame relative to the page, the size of the frame relative to the page, and/or the like can be customized based on the client's preferences. The promotional message includes a link, which can be clicked or tapped by the user.

In response to the user selecting, clicking or tapping the link via the first user interface, the client-to-text server receives a HTTP POST request notifying the client-to-text server of the user's click/tap on the link. The HTTP POST request can include, for example, a purchase identifier associated with the promotional message, a purchase identifier associated with the client providing the promotional message (e.g., a telephone number associated with the client/entity), a shopping cart identifier, purchase information associated with the promotional message, a user identifier (e.g., a user phone number, a user mobile device identifier, user impression data, a user agent field collected by the web browser, and/or any information identifying the user and/or user mobile device), and/or the like.

At step 704, the method includes receiving purchase information associated with the purchase identifier in response to receiving the HTTP POST request. The purchase identifier and the purchase information can be stored in a database at the click-to-text server. The click-to-text server can look up the purchase information based on the purchase identifier. The purchase information can include, for example, a subscription to service associated with the promotional message 202, information related to the products or service associated with the promotional message 202, a product identifier, a subscription identifier, and/or the like.

At step 706, the method includes determining a uniform resource identifier (URI) of a second user interface at the mobile device. In response to receiving the HTTP request from the user mobile device, the client-to-text server can determine, based on a mobile device identifier, a uniform resource identifier (URI) (including, for example, a link syntax) of a second user interface at the user mobile device. The second user interface can be a messaging application, and/or the like. In some implementations, the mobile device identifier can be a user agent field collected by the web browser, a platform type or an operating system type operated at the user mobile device. In some implementations, the mobile device identifier can be a user identifier (e.g., a user phone number, a user mobile device identifier, user impression data, and/or any information identifying the user and/or user mobile device). The client-to-text server can determine the URI of the second user interface that is compatible with the operating system type of the user mobile device. The URI of the second user interface (e.g., a messaging application) may be the same or different for different mobile device operating systems.

At step 708, the method includes sending a signal, based on the URI, to cause the second user interface to be rendered at the mobile device with the purchase information pre-populated to fulfill a purchase requested by the user. The client-to-text server can generate a response message including the URI of the second user interface and send the response message to the user mobile device to cause the second user interface to open with message and phone number pre-populated. The click-to-text server can receive the pre-populated message and phone number based on the purchase identifier from a database at the click-to-text server or a databased stored at the client device. In some implementations, the response message can be a HTTP 303 status code. In some implementations, the response message and the HTTP form that POSTs to the client-to-text server can be stored in the memory of the client-to-text server (e.g., the click-to-text 106 stored at the memory 103 of the client-to-text server 100.) In some implementations, a proper deep-linking (the HTTP POST request and the response message) can direct the user to the native text messaging application, enabling the two-tap subscription or purchase.

The content of the message and/or the phone number can be customized, based on client's preferences, by a click-to-text server. In some instances, the phone number can be a short code cellular number or a long code cellular number. In some instances, the content of the message can be related to, for example, join a subscription list, purchase a product or service, request customer service, or any number of other ways in which the user interacts with the client. In some implementations, the message and the phone number are fixed and cannot be changed by the user. In other implementations, the user has an option to change the content of the pre-populated message and/or the phone number. The user can click or tap the "send" button to send the message to the client associated with the phone number. The message can be sent to a client and/or the click-to-text server. In response to receiving the message, the client server can send a message(s) via the second user interface (e.g., a messaging application) to confirm the user's subscription or purchase. In some implementations, the click-to-text server can send message to confirm the user's subscription or purchase.

In some implementations, the click-to-text server can determine, based on the user identifier, if the user is a new subscriber/customer of the client or an existing subscriber/customer of the client. If the user is a new subscriber/customer, the client server and/or the click-to-text server can send a message(s) via the second user interface (e.g., a messaging application) to confirm the user's subscription, and/or direct the user to a checkout page to provide shipping information and product information for the purchase. If the user is an existing subscriber/customer, the client server and/or the click-to-text server can send a message(s) informing the user that the user are already subscribed to the client's service, or confirming the shipping information and payment information with the user. In some implementations, the user's subscription/customer status associated with the client (e.g., a new subscriber or an existing subscriber) can be stored in a user database of the click-to-text server.

In some implementations, the second user interface is different from the first user interface. In some implementations, the second user interface (e.g., a messaging application) is not a user interface provided by the client/entity/vendor from which the purchase/subscription is to be made. In some implementations, the first user interface is not a user interface (e.g., a web browser) provided by the client/entity/vendor from which the purchase/subscription is to be made. In other words, a user does not need to install the vendor's mobile application to make the purchase from the vendor or subscribe to service provided by the vendor. In situations where, for example, the user is browsing a website with a promotional message, the user can click the "sign-up" link and a messaging application is opened with a message and a phone number pre-populated to complete the purchase/subscription. In such situations, the user do not need to install or open any vendor application. Stated differently, the user can initiate the purchase/subscription upon providing a single user input the second user interface (e.g., click "send" button at the messaging application) within and without interaction with a user interface associated with a vendor from which the purchase is to be made. The click-to-text process provides dynamic application deeplinking at a mobile device such that the user's interaction with a client via a first user interface of the mobile device continues to a second user interface of the mobile device. The dynamic application deeplinking protocol improves the user experience for shopping and interacting, via a network, with a client via the mobile device and increases customer engagement with the promotional messages/marketing efforts by the client.

It is intended that the systems and methods described herein can be performed by software (stored in memory and/or executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including Unix utilities, C, C++, Objective-C Java™, Ruby, SQL, SAS®, the R programming language/software environment, Visual Basic™, and other object-oriented, procedural, scripted, machine language or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

What is claimed is:

1. A method, comprising:
   receiving, at at least one server and from a mobile device executing a first application, a request for a promotional message; and
   receiving, at the at least one server and from the mobile device, an identifier associated with the promotional message,
   sending, from the at least one server and to the mobile device, a deeplink,
   in response to a user interaction with the promotional message displayed by the mobile device via the first application, the deeplink configured to execute (1) automatically causing the mobile device switch from the first application to a messaging application different from the first application and (2) automatically populating a custom text message based on the identifier;
   receiving, at the at least one server and in response to a user interaction with the messaging application, the custom text message in response to detecting a user interaction with the messaging application; and
   enrolling the mobile device in a subscription associated with the promotional message based on the identifier and without receiving any additional information from the mobile device between the deeplink executing and the custom text message being received from the mobile device.

2. The method of claim 1, wherein the user interaction with the messaging application is a tap of a send icon, the tap of the send icon being the only user interaction with the mobile device detected by the mobile device between the user interaction with the promotional message and mobile device being enrolled in the subscription.

3. The method of claim 1, wherein the at least one server includes a client server that hosts a webpage that includes the promotional message.

4. The method of claim 1, wherein the at least one server includes a click-to-text server that is configured to define the deeplink and send the deeplink to the mobile device.

5. The method of claim 1, wherein:
   the at least one server includes a first server that hosts a webpage associated with the promotional message; and
   the at least one server includes a second server that is defines the deeplink and sends the deeplink to the mobile device.

6. The method of claim 1, wherein the at least one server includes a first server, the method further comprising:
   sending, from the first server and to a client server that hosts content accessible via the first application, an integration tag configured to be attached to the content, the integration tag configured to be executed by the mobile device upon the first application accessing the content to cause the mobile device to send the request for the promotional message.

7. The method of claim 1, wherein the at least one server includes a first server, the method further comprising:
   sending, from the first server and to a client server that hosts content accessible via the first application, an integration tag configured to be attached to the content, the integration tag configured to be executed by the mobile device upon determining that a predefined business rule is satisfied to cause the mobile device to send the request for the promotional message.

8. The method of claim 1, wherein the at least one server includes a first server, the method further comprising:
   sending, from the first server and to a client server that hosts a webpage associated with the promotional message, an integration tag configured to be attached to the webpage,
   the integration tag configured to be executed by the mobile device upon the webpage reaching a predefined load state in the first application, the integration tag configured to cause the promotional message to be displayed via the first application.

9. The method of claim 1, wherein the at least one server includes a first server that hosts content accessible via the first application, the method further comprising:
   attaching an integration tag to the content; and
   the mobile device is configured to execute the integration tag upon the first application accessing the content.

10. The method of claim 1, wherein the at least one server hosts content that includes an integration tag configured to cause the mobile device to send the identifier in response to the mobile device requesting and/or loading the content.

11. The method of claim 1, wherein the at least one server hosts content that includes an integration tag configured to cause:
    the at least one server hosts a webpage that includes an integration tag the first application to produce an iframe containing the promotional message in response to the mobile device requesting and/or loading the content.

12. The method of claim 1, wherein the at least one server hosts content that includes means for integrating the promotional message.

13. The method of claim 1, wherein the at least one server is configured to receive an identifier of a cookie stored on the mobile device.

14. The method of claim 1, wherein:
the identifier is a first identifier; and
the deeplink is configured to automatically populate the custom text message with a second identifier such that the at least one server can authenticate the mobile device based on the first identifier and the second identifier.

15. The method of claim 1, further comprising:
identifying the mobile device based on the custom text message; and
sending the mobile device an installment of the subscription based on an identity of the mobile device.

16. At least one non-transitory processor-readable medium storing code configured to be executed by at least one server, the code including instructions configured to cause the at least one server to:
send an integration tag to a client server, the integration tag configured to be attached to content such that when a first application of a mobile device requests and/or loads the content the integration tag executes to cause the mobile device to display a promotional message via the first application;
define a deeplink in response to at least one of the integration tag executing or the first application of the mobile device requesting and/or loading the content, the deeplink configured to be executed by the mobile device in response to a user interaction with the promotional message to cause the mobile device to automatically switch from the first application to a messaging application and to cause the mobile device to automatically populate a text message with a custom body associated with the promotional message,
enroll the mobile device in a subscription associated with the promotional message in response to the text message being sent without receiving any additional information from the mobile device between the deeplink executing and the text message being received from the mobile device.

17. The at least one non-transitory processor-readable medium of claim 16, wherein:
the at least one server includes a click-to-text server; and
the text message is automatically populated with an address of the click-to-text server.

18. The at least one non-transitory processor-readable medium of claim 16, wherein:
the at least one server includes the client server; and
the text message is automatically populated with an address of the client server.

19. The at least one non-transitory processor-readable medium of claim 16, the code further comprising instructions configured to cause the at least one server to enroll the mobile device in the subscription without the at least one server charging a fee to a user of the mobile device.

20. The at least one non-transitory processor-readable medium of claim 16, wherein:
the integration tag is configured to cause the mobile device to send an identifier of a first operating system of the mobile device to the at least one server, the code further comprising instructions configured to cause the at least one server to:
define the deeplink such that the deeplink is compatible with the first operating system and not a second operating system.

21. The at least one non-transitory processor-readable medium of claim 16, wherein the integration tag is configured to cause the mobile device to (1) send user data to the at least one server, and (2) display the promotional message when the user data satisfies a criterion.

22. The at least one non-transitory processor-readable medium of claim 16, the code further comprising instructions configured to cause the at least one server to authenticate a user based on receiving the custom body of the text message.

23. The at least one non-transitory processor-readable medium of claim 16, the code further comprising instructions configured to cause the at least one server to identify an address to which installments of the subscription are to be sent based on the custom body of the text message.

* * * * *